INVENTOR
RICHARD M. SANDERS

March 24, 1970  R. M. SANDERS  3,503,053
THIN FILM PERMUTATION MATRIX
Filed Oct. 30, 1963  5 Sheets-Sheet 2

United States Patent Office 3,503,053
Patented Mar. 24, 1970

3,503,053
THIN FILM PERMUTATION MATRIX
Richard M. Sanders, St. Paul, Minn., assignor to Sperry Rand Corporation, New York, N.Y., a corporation of Delaware
Filed Oct. 30, 1963, Ser. No. 320,202
Int. Cl. G11c 11/14, 15/00, 5/02
U.S. Cl. 340—174                                    35 Claims

ABSTRACT OF THE DISCLOSURE

A thin film permutation matrix for selectively shifting and/or rearranging the bits of a word as the bits are transferred through the matrix. In one embodiment the matrix comprises an arrangement of bicore thin film elements. One element is called the memory element and the other is designated the readout element. Horizontal and vertical drive lines are inductively coupled to the memory core, there being one bicore element at the intersection of each horizontal and vertical drive line. A readout winding is inductively coupled with each readout element. Each bicore element selectively acts as a "connection point" between the vertical drive line and the readout line coupled to it. A bicore element acts as a connecting point if its memory element is set to a predetermined state before the data word is applied to the matrix. This is accomplished by applying a large bias signal to a horizontal drive line concurrently with the application of a signal to a vertical drive line. Subsequently, the data bits to be transferred are selectively applied to the vertical drive lines and if a memory core is set to the predetermined state the signal applied to the vertical drive line coupled to the bicore element will induce a signal in the readout winding coupled to the same element.

Provision is made for selectively masking one or more bits at the same time the bits are transferred. The masking by binary one is accomplished by an additional column of bicore elements each of which has its memory element set to the aforementioned predetermined state if the corresponding output bit is to be a binary one. Masking by binary zero is accomplished by setting all cores in a row in the matrix to the state opposite said predetermined state prior to the application of the data bits to the matrix.

Further embodiments provide for the selective permutation and masking of words as they are transferred through the matrix in either of two directions.

The present invention broadly relates to a permutation matrix system comprised of magnetic thin film elements which may further include a capacity to selectively mask bits during their transfer through the matrix.

For certain kinds of data processing operations, a rearrangement or permutation of information is often required in the nature of a shift and/or interchange. Prior art structure for the most part is restricted to only one type of permutation such as a shifting function. The present invention provides an extremely flexible arrangement wherein virtually any kind of binary bit order change can be effected by merely storing an electrical permutation pattern therein comprised of binary bit values. This novel system is therefore extremely flexible and further lends itself to rapid switchover from one permutation function to another since there need be no modification in its structure. Another function sometimes desired either by itself or as part of a permutation process is the masking of some unknown value by a predetermined value. In the present invention such masking by a predetermined 0 value is accomplished merely by use of a particular electrical permutation pattern, whereas masking by 1 requires only a small amount of additional circuitry.

Therefore, one object of the present invention is to provide means for causing a predetermined arbitrary permutation of the bits of a word, with an optionally superimposed selective clear or selective set masking function in arbitrarily designated bits.

Another object of the invention is to combine permutation and masking functions in one device wherein an output bit can also be an OR function of several input bits.

A further object of the invention is to provide a permutation matrix that can transmit different information signals in either of two directions while changing their positional arrangement according to a predetermined permutation pattern which can be easily varied at high speed.

Another object of the invention is to provide means for transmitting digital information signals in a permuted sequence in two opposite directions simultaneously.

One more object of the present invention is to provide means for transmitting, in a permuted sequence, information signals only in one of two possible directions between two information registers, with the particular direction of transfer being controlled by an external signal.

Still another object of the invention is to provide a permutation matrix which passes signals in a selected one of two opposite directions while blocking signals in the non-selected direction.

Other objects and advantages of the invention will be apparent during the course of the following description to be read in view of the drawings, in which.

Figure 9:
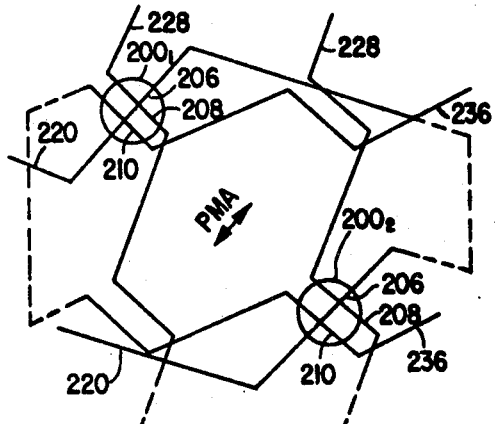
Figure 10:
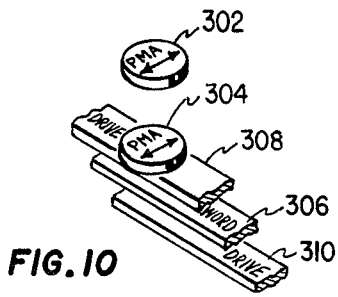
Figure 11:
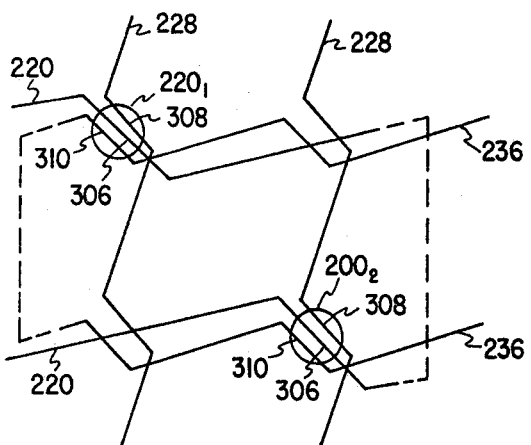
Figure 12A:
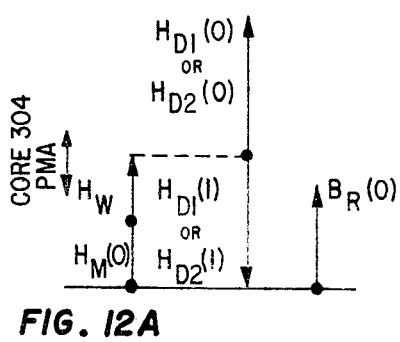
Figure 12B:
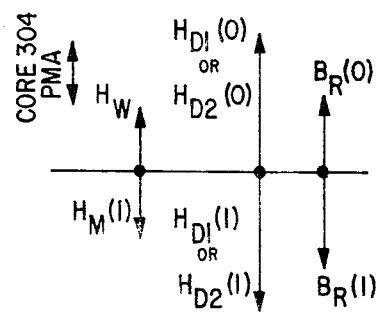
Figure 13:
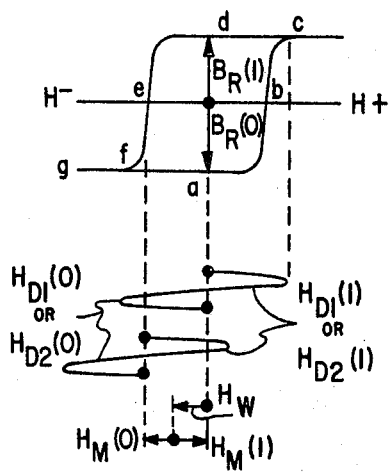
Figure 7:
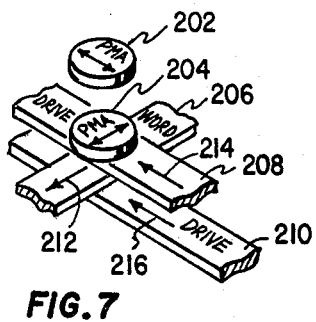
Figure 14A:
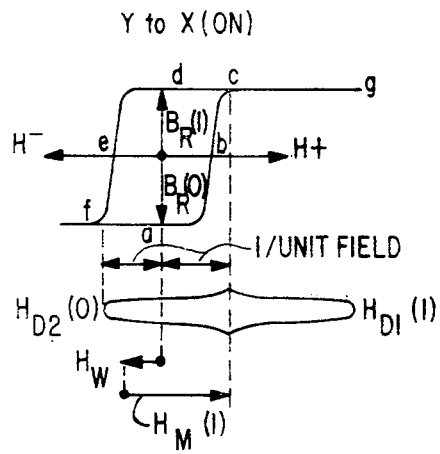
Figures 5, 8B:
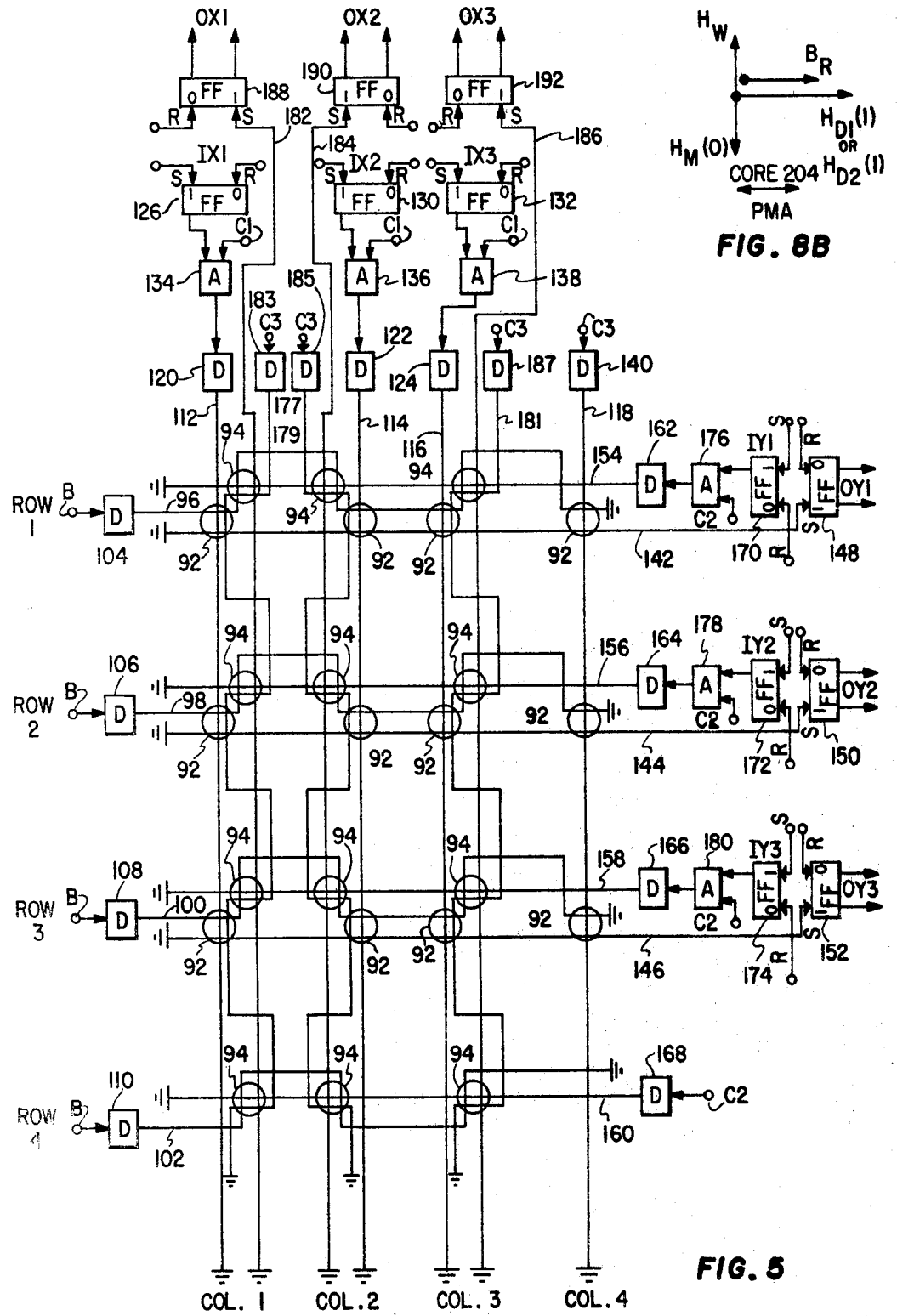
FIGURE 5 shows an alternative embodiment of the invention wherein permutation and/or masking may be simultaneously performed in each direction for all bits.
Figures 6, 8A:
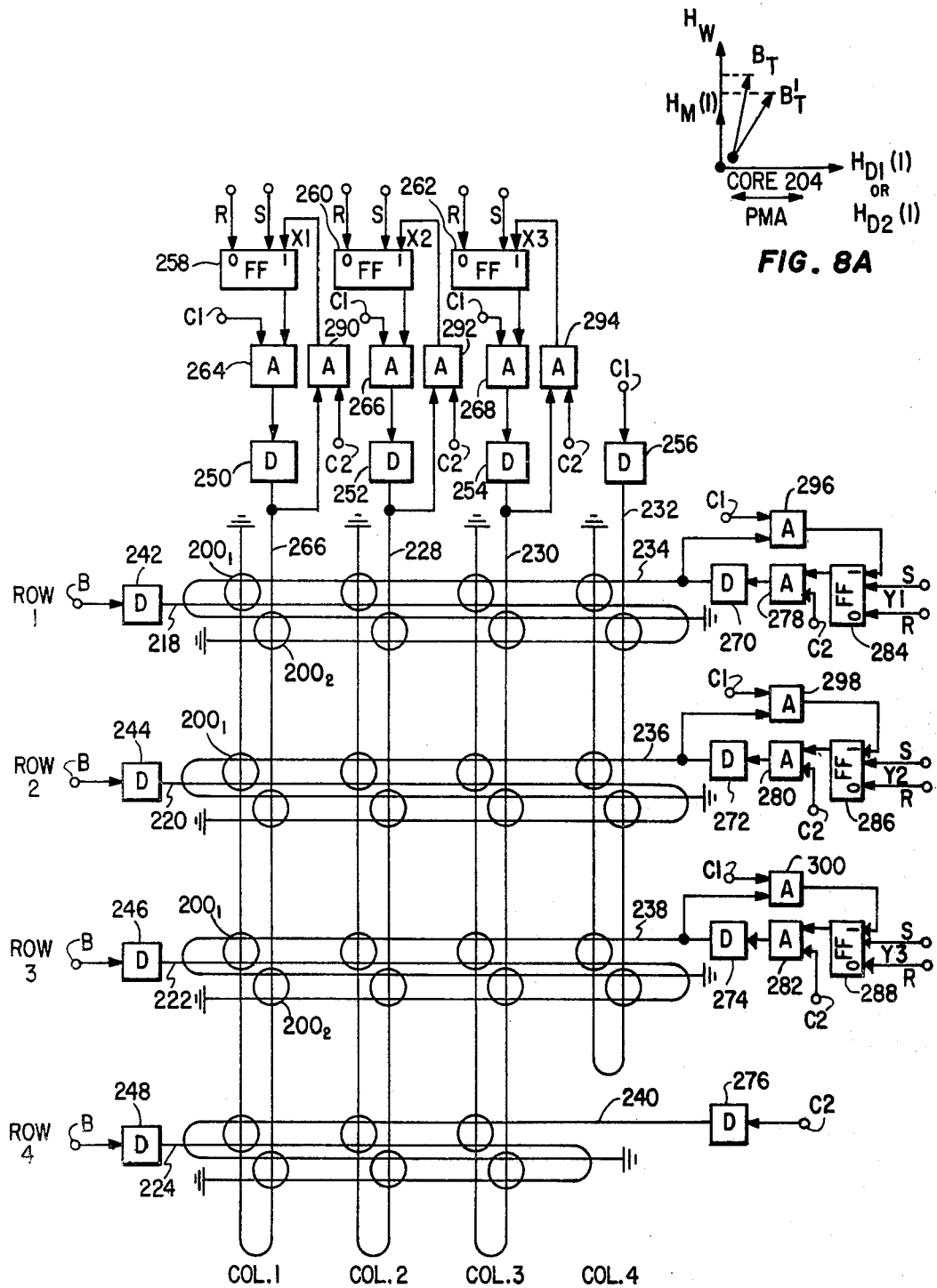

FIGURE 6 diagrammatically shows a third embodiment of the invention wherein permutation can be performed on certain selected bits in one direction while simultaneously permutating other selected bits in the opposite direction;

FIGURE 7 illustrates a preferred construction of the magnetic thin film element used in FIGURE 6;

FIGURES 8A and 8B are vector diagrams illustrating the operation of the FIGURE 7 element;

FIGURE 9 shows the actual winding orientation at each column-row intersection when using the element of FIGURE 7 in FIGURE 6;

FIGURE 10 illustrates an alternative embodiment of a magnetic thin film element for use in FIGURE 6;

FIGURE 11 illustrates the actual winding orientation when using the element of FIGURE 10;

FIGURES 12A, 12B and 13 show one mode of operation for FIGURE 6 when using the element of FIGURE 10; and FIGURES 14A, B, C, and D show an alternative mode of operation for FIGURE 6 when using the element of FIGURE 10.

Figure 1:
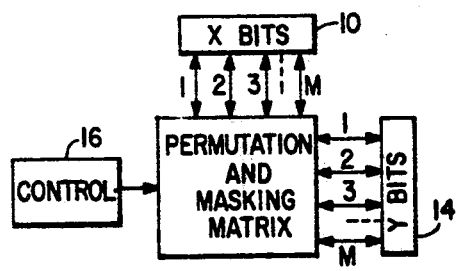
FIGURE 1 is a block diagram of the invention generally showing its function.

FIGURE 1 is a block diagram of the basic invention which illustrates its function. For many data processing operations it may be required to change the original positions relative to one another of binary digits (bits) in a word or sequence to different positions for use elsewhere in the system. Block 10 is taken to represent a binary word (or a storage register therefor) conveniently identified as X having a number M of bits which are individually located in bit positions 1 through M. Each X bit has a value of 1 or 0 in accordance with the well known system of binary notation. A permutation matrix 12 of the present invention is adapted to receive said X bits in parallel and selectively interchange same to different positions so as to create a different parallel word sequence conveniently identified as Y and represented by block 14 which can alternatively be taken to show a storage register therefor. The matrix 12 may also be adapted to receive a group of Y bits and change the positions of same so as to produce an output X bit configuration, either simultaneously with, or alternatively to, an X to Y change. The matrix 12 has the facility of making any type of bit positional change by virtue of a permutation pattern which is stored therein prior to the actual transfer step. For example, the function of the matrix may be to shift all of the X bits one position to the right so that the bit originally in the input X1 position now appears in the output Y2 position; the X2 bit in the Y3 position, and so forth. A different transfer possible with the same matrix but using a different stored permutation pattern therein is one having an X bit left shift of one or more places. On the other hand, a function may require the interchanging of only a selected two X bits one with the other. The matrix 12, upon insertion of the proper permutation pattern for this function, can therefore directly transfer those X bits not required to be interchanged to corresponding Y bit positions while transferring the selected two X bits to interchanged Y bit positions. All embodiments of the matrix 12 are further adapted to simultaneously mask any of the transferred X (or Y) bits with either a binary 0 or binary 1 value. To illustrate this masking technique the bit in any selected Y output position may be required to have a value of 0 (or 1) no matter what the value of an X bit transferred thereto. By utilizing certain additional structure of matrix 12 and/or the proper permutation pattern, said required 0 (or 1) value can always be made to appear in the selected Y output position.

Figure 2:
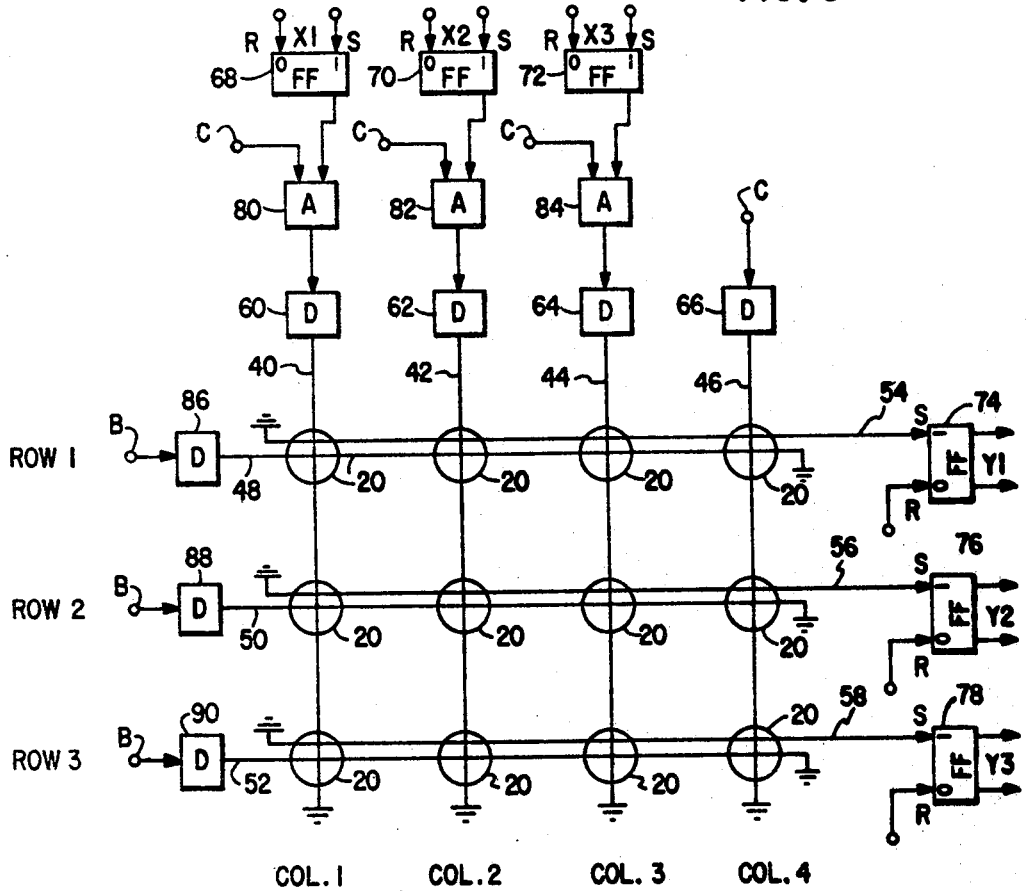
FIGURE 2 is one embodiment of the invention wherein permutation and masking can be simultaneously carried out only in one direction.
Figure 3:
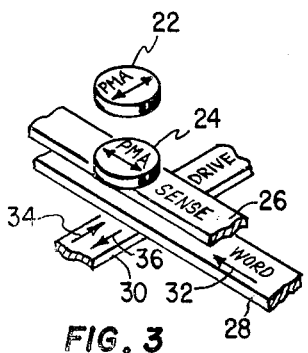
FIGURE 3 illustrates the construction of a preferred magnetic thin film element used in the matrix of FIGURE 2.

FIGURE 2 shows one embodiment of a matrix for a X to Y transfer which accomplishes the basic stated purpose with a minimum of circuitry for all possible permutations. It further combines both permutating and masking functions in one device. A plurality of magnetic thin film elements 20 are arranged in an array of columns 4 and rows 3, with the actual number of each in practice depending upon the number of X bits to be permuted, and whether or not the masking by 1 function is desired. However, before continuing with a description of the arrangement shown in FIGURE 2, FIGURES 3 and 4 are next referred to for the structure and operation of each element 20. In FIGURE 3, each thin film element is preferably comprised of a high coercivity, high anisotropy, high flux memory film core 22 which is inductively coupled with a low anisotropy read-out film core 24 in a manner to form the so-called bicore sandwich structure where the films lie in different planes one above the other. As is well known to those skilled in the art, each of the cores 22 and 24 has a single preferred magnetic axis (PMA) along which can lie remanent magnetization in either direction so as to be stable. Further details of thin magnetic films may be found in the U.S. Patent No. 2,900,282 to Rubens and No. 3,015,807 to Pohm et al. Memory core 22 and read-out core 24 are disposed with respect to one another so that their preferred magnetic axes are transverse to one another preferably at a right angle. Inductively coupled with read-out film 24 is a sense winding 26 whose longitudinal axis is parallel to the core 24 PMA. Likewise inductively coupled with film 24 and parallel with the PMA thereof is a word winding 28. A drive winding 30 is inductively coupled with read-out core 24 such that its longitudinal axis is transverse to the PMA thereof, preferably at a right angle.

Figure 4A:
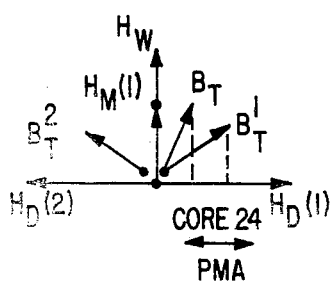
FIGURES 4A and 4B are vector diagrams illustrating the operation of the FIGURE 3 element.
Figure 4B:
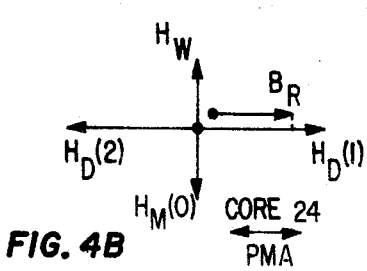

FIGURES 4A and 4B show vector diagrams illustrating the operation of the bicore element of FIGURE 3. If current flows through winding 28 in the direction of arrow 32, assume that the external magnetic field generated thereby is in the direction of $H_W$ so as to be transverse to the PMA of core 24. The external magnetic field of the remanent flux in core 22 will either aid or oppose the effect of field $H_W$ within read-out core 24. FIGURE 4A illustrates how one direction of this core 22 field, labelled $H_M(1)$, adds to the $H_W$ field so as to form a relatively large transverse field in core 24. FIGURE 4B illustrates how the opposite direction of the core 22 field, labelled $H_M(0)$, opposes and subtracts from the $H_W$ field in order to cancel any transverse field effect in read-out core 24. The number in parentheses which is associated with each direction of the $H_M$ field is merely to identify the value arbitrarily assigned to the bit stored in core 22. Another way of identifying the binary state of core 22 is to consider it as being OFF when its remanent magnetization produces field $H_M(0)$, and being ON when its remanent magnetization produces field $H_M(1)$.

If the remanent flux $B_R$ in core 24 normally lies along the PMA in the direction shown in FIGURE 4B, the presence therein of a strong transverse external field, such as is produced by the summation of $H_W$ and $H_M(1)$, causes the core 24 magnetization to actually be biased away from its PMA to a rotated position shown by $B_T$ in FIGURE 4A. If current is then directed through drive winding 30 in the direction of arrow 34, an external field labelled $H_D(1)$ is generated within core 24 in a direction along the PMA which thereupon rotates magnetization $B_T$ to another less biased position here assumed to be shown by vector $B^1_T$. In other words the magnetization B in core 24 is rotated by field $H_D(1)$ so that it makes a smaller angle with the PMA than it did at position $B_T$. In so doing, there is a reduction in the magnitude of that flux component perpendicular both to the core 24 PMA and to sense winding 26 as evidenced by the difference in lengths of the vertical dotted lines drawn from the ends of $B_T$ and $B^1_T$. It will therefore be seen that in the case of FIGURE 4A, there is a change of flux linking sense winding 26 so as to induce an EMF therein whenever the core 24 flux rotates from $B_T$ to $B^1_T$. On the other hand, if there is no external transverse field in core 24 due to cancellation of $H_W$ by $H_M(0)$, the application of an external field $H_D(1)$ at most may cause the core 24 remanent magetization $B_R$ to increase in the same direction along its PMA if the core is not already saturated, but will not cause a rotation of flux in core 24 such as would change the amount linking sense winding 26. In the typical thin film element, however, the core 24 will be saturated along its PMA for the FIGURE 4B condition so that there will not even be any substantial change in the $B_R$ flux. Consequently, an EMF induced on sense winding 26 at the time that current is initially applied to winding 30 indicates that memory core 22 is in its binary 1 or ON condition, whereas the absence of EMF on winding 26 at this time is taken to show that memory core 22 is in its binary 0 or OFF condition. When current is finally terminated through winding 30, field $H_D(1)$ disappears so as to alow the flux in core 24 to revert to its direction $B_T$ in the case of FIGURE 4A, thus inducing an EMF on sense winding 26 which is of polarity opposite to that induced therein when field $H_D(1)$ is first applied. In FIGURE 4B the termination of field $H_D(1)$ merely causes the magnitude of the remanent magnetization to return to its original value if unsaturated, but in any event does not create a change in direction such as would induce an EMF in sense winding 26 at this time.

Although current in only one direction need be temporarily applied to winding 30 in order to obtain an indication of the state of core 22, an A.C. signal may alternatively be used so as to produce a larger rotation of the core 24 flux which in turn would improve the signal-to-noise ratio. For example, if core 22 is ON as in FIGURE 4A, a current pulse through winding 30 in first a direction 34 and then in a direction 36 will sequentially produce fields $H_D(1)$ and then $H_D(2)$ which are diametrically opposed to one another. The first applied field $H_D(1)$ rotates the flux in core 24 from its $B_T$ position to a $B_T{}^1$ position, whereas the next following applied field $H_D(2)$ rotates the flux from $B_T{}^1$ to $B_T{}^2$. At the conclusion of field $H_D(2)$, the flux reverts to its $B_T$ position. If there is no transverse filed applied to element 20 at the time when current is generated in winding 30, there will be no rotation of the remanent magnetization $B_R$ in core 24 even though the opposite field $H_D(2)$ is temporarily applied. This is because the anisotropy field $H_K$ of core 24 is greater than either of the fields $H_D(1)$ or $H_D(2)$, so that any rotational switching of flux therein requires the presence of a transverse field. Hence, the oppositely applied field $H_D(2)$ in FIGURE 4B might reduce the magnitude of magnetization $B_R$ along the PMA, but will not rotate same so as to induce an EMF in sense winding 26.

The drive and word windings 30 and 28 of an element 20 can also be conveniently employed to enter binary information into the memory core 20. Normally, the magnitudes of the currents in said windings, and hence the magnitudes of fields $H_D$ and $H_W$, are kept small enough during readout time so as to avoid switching or otherwise changing the flux direction in the higher coercivity core 22, while still being large enough to modify flux in the lower coercivity core 24 as described above. The field $H_W$ (which is parallel to the PMA of core 22) can be increased to a value which, in the presence of the field $H_D$ (transverse to core 22 PMA), causes the flux in the memory film to rotate to a direction governed by the direction of field $H_W$. Therefore, if current of proper writing magnitude is sent through word winding 28 selectively in either direction and concurrently with current in drive winding 30, the resulting larger $H_W$ field places core 22 in either its OFF or ON condition. Field $H_W$ could be made large enough to switch the core 22 flux even without the use of field $H_D$, but where different binary information is to be entered into each of several elements having a common word winding, but individual drive windings, the coincident operation of a drive winding and a word winding provides a simple method for writing a binary bit into any selected element.

The description of FIGURE 2 will now be continued with particular reference to FIGURE 3. In each vertical column of the matrix the drive windings of the elements 20 therein are connected in series circuit so as to form a common column drive winding. For example, column drive windings 40, 42, 44, and 46 are respectively individual to columns 1, 2, 3, and 4. In similar fashion, elements 20 in the same row have their word windings 28 connected together in series circuit so as to form row word windings 48, 50, and 52 which are individual to the respective rows 1, 2, and 3. A row sense winding is also provided by connecting the sense windings 26 of elements in the same row in series circuit. Thus, row windings 54, 56, and 58 are individual to the respective rows 1, 2, and 3.

Each of a group of drive amplifiers 60, 62, 64, and 66 is individually connected with a respective one of the column drive windings 40, 42, 44, and 46 in order to selectively produce current flow therethrough when enabled by an input signal. For drive amplifiers 60, 62, and 64, each said input signal is applied only when a respective X bit is of binary value 1 as evidenced by the state of a respective one of flip-flop register stages 68, 70, and 72. These three flip-flops respectively hold the X1, X2, and X3 input bits while a set of flip-flops 74, 76, and 78 respectively store the Y1, Y2, and Y3 output bits. In order to sample the state of the X flip-flops, AND gates 80, 82, and 84 are provided with each responsive to a flip-flop binary 1 condition at a C gating signal time in order to energize a respective one of the drivers. Each flip-flop 68, 70, and 72 may be set to its binary 1 condition by a signal entering on its Set (S) input lead, or alternatively, may be reset to a binary 0 condition upon application of a signal to its Reset (R) input lead. Driver 66, which is connected to column drive winding 46, may either be enabled to produce current flow therein by the gating signal C applied thereto, or may be selectively enabled only when a particular kind of masking operation is desired.

Each of the Y output flip-flops 74, 76, and 78 has its S input terminal connected to a respective one of the row sense windings 54, 56, and 58 so that an EMF induced thereon will place the associated Y flip-flop into its binary 1 condition. These flip-flops further include a Reset terminal R to which signals may be selectively applied for initially placing them in a binary 0 state prior to a transfer of information thereto from the X flip-flops. Drivers 86, 88, and 90 are respectively connected to the row word windings 48, 50, and 52 in order to produce current flow therethrough so as to generate the $H_W$ field for each element in the matrix. These drive amplifiers 86–90 may be continuously biased to produce said current flow by signals B applied thereto, or may be selectively energized if so desired.

Since the memory core 22 of each matrix thin film element 20 may be conveniently set to its ON or OFF state by the coincident current operation of its windings 28 and 30, a permutation pattern can be entered into the FIGURE 1 matrix by the following procedure. Each of the word drivers 86, 88, and 90 can further be designed so as to selectively apply current in either direction to its respective word winding so as to generate either the field $H_W$ shown in FIGURE 4A or a field $H_W'$ (not shown) which lies in the opposite direction thereof. Any $H_W$ field at this write time also should be of sufficient magnitude such that, in the presence of field $H_D(1)$, the magnetization in memory core 22 is switched to one or the other direction along its PMA. Assume that memory core 22 of the row 1-column 1 element 20 is to be set ON, whereas the memory cores of the remaining elements 20 in column 1 are to be set OFF. Flip-flop 68 is set to a binary 1 so that upon the subsequent application of a C signal to AND gate 80, driver 60 will be energized to generate the $H_D(1)$ field. Driver 86 is biased such that it produces current flow through winding 48 to generate the field $H_W$ at all row 1 elements (FIGURE 4A) which has greater magnitude than is normally used for interrogation of the matrix. Drivers 88 and 90 have their bias signals B adjusted so that they produce current in the opposite direction through their respective windings 50 and 52 in order to generate an $H_W'$ field at all row 2 and row 3 elements. However, the magnitudes of these $H_W$ and $H_W'$ fields are insufficient by themselves to change the flux direction in the memory cores of the matrix elements. After driver 86, 88, and 90 have been so biased, a C signal is then applied to only AND gate 80 so that driver 60 produces the field $H_D(1)$ in only column 1 of the matrix. A large $H_W$ field coupled with the presence of $H_D(1)$ thereby causes the memory core 22 of the column 1-row 1 element 20 to be switched so that its flux lies in a direction which generates the $H_M(1)$ field. A large $H_W'$ field causes the memory core in row 2 and row 3 of column 1 to be switched so that the flux in each lies in a direction to generate the $H_M(0)$ field. Only cores in column 1 of the matrix are switched at this time due to the fact that the transverse field $H_D(1)$ is not being applied to columns 2, 3, and 4. After the column 1 elements have their memory cores set to the desired permutation pattern, AND gate 80 is disabled and drivers 86, 88, and 90 are then adjusted so that current flow in windings 48, 50, and 52 will be in directions according to the bit values to be placed into the memory cores of column 2. Flip-flop 70 is set to 1 and signal C is next applied to AND gate 82 so that the transverse field $H_D(1)$ is only applied to the column 2 elements during the presence of large magnitude $H_W$ and/or $H_W'$ fields. After the permutation pattern has been entered into column 2, signal C is removed from AND gate 82 and drivers 86, 88, and 90 are adjusted so that pattern bits can next be entered into column 3 when AND gate 84 is enabled in sequence. Permutation pattern bits are entered into column 4 by biasing drivers 86, 88, and 90 to provide current in one direction or the other through their respective word windings such that the application of a signal C to driver 66, each of the memory cores in column 4 will be selectively driven to either an ON or OF state. After the permutation pattern has been entered into all of the columns of the matrix, it may then be necessary to have a dummy interrogate cycle prior to the actual transfer of any X bits, in order that the read-out core 24 of each element 20 will be properly polarized so that its flux $B_T$ lies in the direction shown in FIGURE 4A. This dummy cycle can be performed by biasing drivers 86, 88, and 90 such that current flow therein produces the $H_W$ field for each row, and setting flip-flop 68, 70, and 72 to a binary 1 condition. The C signal is then simultaneously applied to AND gates 80, 82, and 84, and to driver 66 so as to generate the $H_D(1)$ field for each column. This $H_D(1)$ field acts to place the flux in each read-out core 24 of the matrix into the same direction $B_T$ so that during a subsequent X to Y transfer cycle, the field $H_D(1)$ can cause an EMF of some predetermined polarity to be induced upon a sense winding.

Instead of using the existing drive and word windings of the matrix to store the permutation pattern therein, additional sets of windings could be provided for switching the memory films. Such windings are not shown in FIGURE 3 but would be positioned adjacent to each memory core 22 and oriented therewith in the manner of windings 28 and 30. It should also be noted here that in place of a memory core 22 to generate the $H_M(1)$ and $H_M(0)$ fields, a winding individual to each read-out core 24 could alternatively be provided and oriented such that it produces one or the other of said fields according to the direction of current flow therein. The advantage of the bicore construction, however, are that fewer external connections to the matrix are required, and the permutation pattern can be held therein without the continuous expenditure of electrical energy which would otherwise be required if a winding were required for the $H_M$ fields.

Reference is now made to the following Tables 1 through 8 which illustrate the utility of the permutation and masking matrix of FIGURE 2. Table 1 below shows a mode of operation wherein the X1, X2, and X3 bits are transferred without change in either value or position to form the respective Y1, Y2, and Y3 bits.

TABLE 1

|   | X1 | X2 | X3 |   |   |   |   |
|---|----|----|----|---|---|---|---|
| (1)...... | 0 | 1 | 0 | | | | |
| (2)...... | 1 | 1 | 0 | | | | |
| R1...... | 1 | 0 | 0 | 0 | 0 | 1 | Y1 |
| R2...... | 0 | 1 | 0 | 0 | 1 | 1 | Y2 |
| R3...... | 0 | 0 | 1 | 0 | 0 | 0 | Y3 |
|   | C1 | C2 | C3 | C4 | (1) | (2) |   |

This transfer is accomplished by setting ON, as represented by a binary 1 value in Table 1, the memory cores of the following matrix elements: Row 1(R1), column 1(C1); Row 2(R2), column 2(C2); and Row 3(R3), column 3(C3). All other matrix elements have their memory cores set OFF as represented by the 0 values in Table 1. If in a first (1) combination the X1, X2, and X3 bits are 010, respectively, then the Y1, Y2, and Y3 bits also must respectively be 010. Consider first the X1 bit of binary 0 value. Flip-flop 68 is in its OFF condition to represent binary 0 so that driver 60 cannot produce current flow through drive winding 40 at the time that a signal C is applied to AND gate 80. This means that even though the R1, C1 element 20 has its memory core set to ON, there is no EMF induced on output sense winding 54. Consequently, the Y1 flip-flop 74 remains OFF thus indicating a Y1 output bit of binary 0 value. The X2 bit, on the other hand, is a binary 1 so that flip-flop 70 is in its ON condition. Consequently, when a signal C is applied to AND gate 82, driver 62 produces current flow in drive winding 42 which causes a rotation of flux only in the read-out core of that element 20 found in row 2-column 2 of the matrix. Those elements in row 1-column 2, and row 3-column 2 have no rotation of flux therein due to the fact that their memory cores are OFF as indicated in Table 1. Therefore, only sense output winding 56 has an EMF induced thereon from the row 2-column 2 element so as to set flip-flop 76 to binary 1. In column 3, only the row 3 element thereof has its memory core set to binary 1. However, the X3 flip-flop 72 is OFF to prevent current flow in drive winding 44. This means that the flux in the read-out core of the row 3-column 3 element remains at its position $B_T$ even when a signal C is applied to AND gate 84. Hence, no EMF is induced on sense winding 58 which thus leaves flip-flop 78 in its binary 0 condition. In column 4 the memory core of all elements 20 are at binary 0 so that the application of a signal C to driver 66 fails to induce an EMF on any of the row sense windings.

As a further example of a transfer without change in value or position, consider now a second (2) combination having 110 for the X1, X2, and X3 bits, respectively. The X1 bit of value 1 produces current in winding 40 to thereby cause a rotation of flux in only the row 1 element so as to set the Y1 flip-flop 74 to its ON (1) condition. Likewise, the X2 bit causes the row 2-column 2 element 20 to have flux rotation in its read-out core so as to induce an EMF on output sense winding 56 which thereupon sets flip-flop 76 to binary 1. The X3 bit of binary 0 value fails to cause current in drive winding 44 so that there can be no rotation of flux in the row 3-column 3 element. Therefore, flip-flop 78 remains at binary 0 at the conclusion of the transfer cycle. The Y1, Y2, and Y3 output bits are therefore seen to have respective values of 110 which are identical to the X1, X2, and X3 bits.

Table 2 below illustrates how masking can be performed simultaneously with the transfer of X bits to the Y bit output.

TABLE 2

|   | X1 | X2 | X3 |   |   |   |   |
|---|----|----|----|---|---|---|---|
| (1)...... | 0 | 1 | 0 | | | | |
| (2)...... | 1 | 1 | 0 | | | | |
| R1...... | 1 | 0 | 0 | 0 | 0 | 1 | Y1 |
| R2...... | 0 | 0 | 0 | 0 | 0 | 0 | Y2 |
| R3...... | 0 | 0 | 1 | 0 | 0 | 0 | Y3 |
|   | C1 | C2 | C3 | C4 | (1) | (2) |   |

Assume that Y2 must always be binary 0 no matter what the value of a transferred X bit. To accomplish this function, all row 2 elements 20 of the matrix have their memory cores set to 0 so that it is impossible to ever induce an EMF on sense output winding 56. Further assume that the problem calls for a transfer without change in either value or position of the X1 and X3 bits to the respective Y1 and Y3 outputs which require that elements 20 of row 1-column 1 and row 3-column 3 be set to binary 1. All elements in column 4 remain at 0. For a first (1) combination of X1=0, X2=1, and X3=0, it will be seen that sense windings 54 and 58 do not have EMF induced thereon due to the fact that drive windings 40 and 44 have no current flow therein at the time that signals C are applied to AND gates 80, 82, and 84. Drive winding 42 has current flow therein because of the binary 1 in flip-flop 70, but since no column 2 element 20 has its memory core set to binary 1 there is no EMF induced on any of the output sense windings. Consequently, the Y bits have values of 000 rather than 010. As a further example, Table 2 shows a second (2) combination of X bits with values 110. The X1 bit and the X3 bit are transferred without change in value or position to the Y1 and Y3 outputs, but the X2 bit of value 1 is masked by 0 to appear as 0 at Y2.

Table 3 below illustrates how masking by 1 occurs whereby a binary 1 value is placed into a selected Y output flip-flop no matter what the value of the transferred X bit.

TABLE 3

|  | X1 | X2 | X3 |  |  |  |  |
|---|---|---|---|---|---|---|---|
| (1) | 0 | 1 | 0 |  |  |  |  |
| (2) | 1 | 1 | 0 |  |  |  |  |
| R1 | 1 | 0 | 0 | 0 | 0 | 1 | Y1 |
| R2 | 0 | 1 | 0 | 0 | 1 | 1 | Y2 |
| R3 | 0 | 0 | 1 | 1 | 1 | 1 | Y3 |
|  | C1 | C2 | C3 | C4 | (1) | (2) |  |

Assume that Y3 is always to have a value of binary 1. The memory core of the row 3-column 4 element 20 is set to its ON state so that sense winding 58 always has an EMF induced thereon at the application of a signal C to driver 66. Further assume the X bits are to be transferred to the Y outputs without change in value or position except for the masking of the X bit to Y3. Thus, row 1-column 1; row 2-column 2, and row 3-column 3 elements of the matrix have their memory cores set to binary 1 as was previously done in the examples of Tables 1 and 2. For a first (1) combination of X bits of 010, it is seen that Y1 and Y2 are respectively 0 and 1. The X3 bit of binary 0 value normally would fail to induce an EMF on sense winding 58 even though the row 3-column 3 element is set to 1. However, because the column 4 element of row 3 is set to 1, a signal C to driver 66 causes flux rotation in its readout core to set flip-flop 78 to binary 1, thus masking the binary 0 value of X3. If the X bits instead have values 110, the X3 0 value is masked with 1, held in column 4, so as to make Y3 also a binary 1. The Y1 and Y2 bits have values corresponding to the X1 and X2 bits of this second (2) combination. It is thus seen that masking by this mode of operation requires that a selected one of the column 4 elements have its memory core set ON so that EMF is always induced on the associated sense winding no matter what the value of the transfered X bit might be. The matrix of FIGURE 2 therefore permits either masking by 0 or masking by 1 simultaneously with the transfer of bit values from X to Y.

The examples of Tables 1, 2 and 3 given above show that there is no permutation, i.e. change of position, of the X bits during their transfer to the Y output. By setting ON the memory cores of other elements 20, many X bit permutations may be effected. Table 4 below illustrates the technique of transferring X1 to Y3, X2 to Y2, and X3 to Y1. Masking is not shown to be performed in Table 4, but may be done in the manner illustrated in Tables 2 and 3 above.

TABLE 4

|  | X1 | X2 | X3 |  |  |  |  |
|---|---|---|---|---|---|---|---|
| (1) | 0 | 1 | 0 |  |  |  |  |
| (2) | 1 | 1 | 0 |  |  |  |  |
| R1 | 0 | 0 | 1 | 0 | 0 | 0 | Y1 |
| R2 | 0 | 1 | 0 | 0 | 1 | 1 | Y2 |
| R3 | 1 | 0 | 0 | 0 | 0 | 1 | Y3 |
|  | C1 | C2 | C3 | C4 | (1) | (2) |  |

Table 4 shows that the following elements 20 have their memory cores set ON: Row 1-column 3; row 2-column 2; and row 3-column 1. Thus, for a first (1) X bit combination of 010, the bits 010 appear in the Y flip-flops, whereas for X bits 110, the bits 011 appear at Y.

Table 5 below shows the matrix set to a permutation pattern whereby X1 is transferred to Y1, X2 to Y3 and X3 to Y2. Masking is not performed in the two examples shown.

TABLE 5

|  | X1 | X2 | X3 |  |  |  |  |
|---|---|---|---|---|---|---|---|
| (1) | 0 | 1 | 0 |  |  |  |  |
| (2) | 1 | 1 | 0 |  |  |  |  |
| R1 | 1 | 0 | 0 | 0 | 0 | 1 | Y1 |
| R2 | 0 | 0 | 1 | 0 | 0 | 0 | Y2 |
| R3 | 0 | 1 | 0 | 0 | 1 | 1 | Y3 |
|  | C1 | C2 | C3 | C4 | (1) | (2) |  |

The matrix of FIGURE 2 may also be used to shift the X bits either right or left for any selected number of positions. Table 6 illustrates a shift of one position to the left during transfer, with a binary 0 added to the right most position.

TABLE 6

|  | X1 | X2 | X3 |  |  |  |  |
|---|---|---|---|---|---|---|---|
| (1) | 0 | 1 | 0 |  |  |  |  |
| (2) | 1 | 1 | 0 |  |  |  |  |
| R1 | 0 | 1 | 0 | 0 | 1 | 1 | Y1 |
| R2 | 0 | 0 | 1 | 0 | 0 | 0 | Y2 |
| R3 | 0 | 0 | 0 | 0 | 0 | 0 | Y3 |
|  | C1 | C2 | C3 | C4 | (1) | (2) |  |

By setting the row 1-column 2 and the row 2-column 3 elements to binary 1, it is seen that X2 is transferred to Y1, X3 to Y2, and binary 0 is always placed into Y3. Table 7 illustrates a similar left shift for one position but wherein the leftmost X bit is shifted to the rightmost Y position. In other words, Table 7 illustrates a circular shift of one position to the left. This requires that X2 be transferred to Y1, X3 to Y2, and X1 to Y3. The permutation pattern in the matrix consists therefore in setting the following memory cores to an ON condition: row 1-column 2; row 2-column 3; and row 3-column 1.

TABLE 7

|  | X1 | X2 | X3 |  |  |  |  |
|---|---|---|---|---|---|---|---|
| (1) | 0 | 1 | 0 |  |  |  |  |
| (2) | 1 | 1 | 0 |  |  |  |  |
| R1 | 0 | 1 | 0 | 0 | 1 | 1 | Y1 |
| R2 | 0 | 0 | 1 | 0 | 0 | 0 | Y2 |
| R3 | 1 | 0 | 0 | 0 | 0 | 1 | Y3 |
|  | C1 | C2 | C3 | C4 | (1) | (2) |  |

The permutation and masking matrix of FIGURE 2 also can be used to logically combine two or more X bits in order to produce a selected Y bit. This logical operation takes the form of a disjunctive (OR) operation whereby if any X bit of those combined has a binary 1 value, the selected Y bit also is binary 1. To illustrate, consider the examples in Table 8 below.

TABLE 8

|  | X1 | X2 | X3 |  |  |  |  |
|---|---|---|---|---|---|---|---|
| (1) | 0 | 1 | 0 |  |  |  |  |
| (2) | 1 | 1 | 0 |  |  |  |  |
| R1 | 1 | 1 | 0 | 0 | 1 | 1 | Y1 |
| R2 | 0 | 1 | 1 | 0 | 1 | 1 | Y2 |
| R3 | 1 | 0 | 1 | 0 | 0 | 1 | Y3 |
|  | C1 | C2 | C3 | C4 | (1) | (2) |  |

A permutation pattern is stored in the matrix whereby the value of bit Y1 is generated by the logical OR combination of X1 and X2; Y2 is the logical OR combination of X2 and X3; and Y3 is the logical OR combination of X3 and X1. No masking is performed for either of the examples in Table 8. Consider now the bits X1 and X2 of the first (1) X bit configruation 010. Both the column 1 and column 2 elements of row 1 have their memory cores set to binary 1 so that an EMF is induced in output sense winding 54 from the read-out core of the row 1-column 2 element. This makes Y1 a binary 1 value in accordance with the Boolean algebra equation 1=0+1. Since the column 2 and column 3 elements of rows 2 likewise are set ON, the binary 1 value of bit X2 causes a signal to be induced in sense winding 56 so as to set Y2 equal to binary 1. In row 3, both the column 1 and column 3 elements are set to ON, but neither X1 nor X3 permits current flow in drive windings 40 and 44, respectively. Consequently, Y3 is binary 0 which is the result of the logical operation 0+0. Table 8 further shows a second (2) X bit configuration of 110 whose bits are logically combined to form a Y output configuration of 111. Thus, according to the number and location of the ON elements in the same matrix row, any combination of X bits may be logically OR'ED together to form the Y bit associated with said row. In this connection, it should perhaps be mentioned that following customary engineering practice each sense winding 54, 56, and 58 is usually connected to an individual integrating sense amplifier of any well known type whose output in turn is applied to the respective one of the Y flip-flops. Each said integrating sense amplifier accepts induced sense winding EMF's of either polarity for generating an output signal of a same predetermined polarity which, in the present embodiment, is taken to represent binary 1 used to set the Y flip-flop to its 1 condition.

For each of the examples discussed above, the preferred mode of operation is that signals C are simultaneously applied at transfer time to the AND gates 80, 82, and 84, and to driver 66 so as to effect high speed permutation of the X bits in parallel according to the permutation pattern stored in all of the matrix elements 20. Of course, prior to this transfer time flip-flop 68, 70, and 72 are set or cleared by appropriate control circuitry to represent the incoming X bit values, and the Y output flip-flops are all cleared to represent binary 0. However, the enabling of the AND gates 80–84 and the driver 66 could be sequentially performed if desired. Furthermore, although the matrix shown in FIGURE 2 comprises only four columns (one column for masking by 1) and three rows of elements 20, it is to be understood that any number M of columns and rows may be employed to permute a number M of X bits. Where there is required a selective masking by 1 during the X to Y transfer, then an additional one or more masking columns are required the exact number of which may be conveniently represented by N. In FIGURE 2, therefore, M is equal to 3 and N is equal to 1 so that the number of columns is 3+1(M+N)=4. More than one masking column (N>1) might be used in some stored program system environments with each storing a different combination of permutation pattern bits so that upon selective energization of its column drive winding by the control program requirements, different ones of the X bits can be masked. The use of the terms "column" and "row" is done merely to simplify the description of the element locations therein and is thus not to be construed as a limitation on the organization of the matrix as regards the direction of bit transfer therethrough for an X to Y permutation.

FIGURE 5 shows an alternative embodiment of the permutation and masking matrix which consists essentially of two superimposed but oppositely directed unilateral permutation matrices each on the order of that shown in FIGURE 2. It provides a means for transferring digital information signals in a permuted arrangement in both directions simultaneously. One such permutation matrix, for transferring X bits to Y bits, is comprised of bicore elements 92 arranged in three rows and four columns, and having three input X bits IX1, IX2, and IX3 to be selectively recombined as three output Y bits OY1, OY2, and OY3. Column 4 thereof is used to mask selected X bits with binary 1 values. The second unilateral permutation matrix, for transferring Y bits to X bits, is comprised of bicore elements 94 arranged in four rows and three columns and having three input Y bits IY1, IY2, and IY3 to be selectively recombined as three output X bits OX1, OX2, and OX3, with the fourth row being provided to mask selected Y bits with binary 1 values. Each bicore element 92 and 94 is preferably constructed in the manner shown in FIGURE 3 so as to have a magnetic thin film memory core 22 and a thin film read-out core 24 whose PMA's are perpendicular one to the other. Each element 92 and 94 further has sense and word windings 26 and 28 which are both parallel to the PMA of read-out core 24, and a drive winding 30 which is perpendicular to said PMA. For each row of the matrix the word windings 28 of all elements 92 and 94 therein are connected in series circuit so as to form a row word winding such as 96, 98, and 100 which are individual to the respective rows 1, 2, and 3. Only elements 94 need be present in row 4 of the matrix, each of which also has its word winding connected in series circuit to form a row 4 word winding 102. These row word windings 96, 98, 100, and 102 are respectively connected to drivers 104, 106, 108, and 110 which in turn are biased by signals B so as to have current flow through each winding in order to generate the $H_W$ field of FIGURES 4A and 4B.

For each matrix column, the elements 92 therein have their drive windings 30 connected in series circuit so as to form a vertical or column drive winding such as 112, 114, 116, and 118 individual to the respective columns 1–4. Current in any of the drive windings 112, 114, and 116 is generated whenever an associated driver 120, 122, and 124 is actuated by a binary 1 value of the respective input X bits IX1, IX2, and IX3. These input X values are held in respective flip-flops 126, 130, and 132 whose condition 1 output terminals are simultaneously sampled by respective AND gates 134, 136, and 138 at a transfer time during which signals C1 appear. The column drive winding 118 is connected to a driver 140 which in turn is also enabled by a signal C1 in order that X bits selected by the permutation pattern can be masked with binary 1 during transfer to Y output flip-flops 148, 150, and 152. For each row of the matrix, the sense windings of elements 92 are connected in series circuit so as to form horizontal or row output sense windings such as 142, 144, and 146 for respective rows 1, 2, and 3 which in turn are connected to the S input terminals of the respective Y output flip-flops 148, 150, and 152. These flip-flops contain the OY1, OY2, and OY3 bits whose values are derived from the permuted IX1, IX2, and IX3 bits.

For each matrix row, the elements 94 have their drive windings 30 connected in series circuit to form a horizontal or row drive winding such as 154, 156, 158, and 160 each respectively connected to driver circuits 162, 164, 166, and 168. Each driver 162, 164, and 166 is able to produce current in its respective drive winding whenever its associated input Y bit IY1, IY2, or IY3 has a binary 1 value as represented by the ON or binary 1 condition of respective flip-flops 170, 172, and 174. The binary 1 condition of each Y input flip-flop is gated by means of a respective one of AND gates 176, 178, and 180 each being pulsed, preferably simultaneously, by means of signals C2. Driver 168 is also enabled by signal C2 so as to produce current in row drive winding 160 for masking purposes. For each matrix column, the elements 94 have their sense windings 26 connected in series circuit to form a vertical or column output sense winding such as 182, 184, and 186 each respectively connected to the ON input terminal of one of the flip-flops 188, 190, and 192 which hold the output X bits OX1, OX2, and OX3.

Although five sets of windings in FIGURE 5 has so far been described, a different etched circuit layer is not required for each. The row drive windings 154 et al. and the row sense windings 142 et al. can both occupy a same first layer, but in spaced apart relationship therein so as to avoid stray pickup by a row sense winding due to current change in the row drive winding. Similarly, the column drive windings 112 et al. and the column sense windings 182 et al. can both occupy a same second layer at a spaced apart relationship therein to prevent stray pickup. The row word windings 96 et al. are etched in a third layer.

A permutation bit pattern can be placed into the matrix of FIGURE 5 by the coincident current operation of all row word windings 96 et al. and any one of sixth set of column drive windings 177, 179, and 181 not shown in FIGURE 3. These additional drive windings are respectively connected to drivers 183, 185, and 187. Each of the windings 177 et al. is inductively coupled with all elements 92 and 94 in its associated column and is oriented approximately parallel to the PMA of the memory cores in a fourth etched circuit layer. Their purpose is to provide a small transverse field $H_D$ to each memory core in the column so that the memory core remanent flux can be switched to some selected direction along its PMA in accordance with the polarity of current flow through the associated row word winding during a write time. For example, to place a permutation pattern into column 1 of FIGURE 5, the drivers 104, 106, 108, and 110 are biased to cause current flow in one direction or the other through their associated row word windings 96, 98, 100, 102 in order to generate either a large writing $W_W$ field in the direction shown in FIGURE 4A, or a large writing $H_W'$ field in the opposite direction. This field magnitude is still insufficient to cause switching of memory core flux in the absence of a field $H_D$ transverse to the PMA. Only driver 183 is energized by a signal C3 selectively applied thereto so as to cause current flow in column winding 177. This applies a small transverse field $H_D$ to each bicore 92 and 94 in said column 1 of the matrix and switches flux in each colunm 1 memory core to either an OFF or an ON condition according to the direction of current in its associated word winding. After column 1 has been loaded with its permutation pattern bits, driver 183 is de-energized and the drivers 104 et al. are biased to current conducting states so as to represent the binary bits to be entered into the bicores 92 and 94 of column 2. By enabling only driver 185 with a C3 signal selectively applied thereto, each memory core of column 2 elements 94 and 92 is driven to an ON or OFF flux state. Permutation bits are stored in the memory cores of column 3 by the application of a C3 signal to driver 187 at a time when drivers 104 et al. are biased to the appropriate current conducting states. Column 4 may have an additional column drive winding in the manner of windings 177, 179, and 181, but the regular column drive winding 118 can be employed to generate the transverse field $H_D$ required to effect flux switching a memory core. From the above it will therefore be seen that both bicores 92 and 94 at a column-row intersection are set to the same memory core flux state, either ON or OFF, since the row word winding common to both is used to enter the permutation bit value. Furthermore, only one column at a time can be set during a write C3 cycle. If desired, each memory core in the matrix could be dispensed with by substituting therefore a winding individual to each element 92 and 94 for generating the fields $H_M(1)$ or $H_M(0)$.

The operation of FIGURE 5 is quite similar to FIGURE 2 except that information can be transferred simultaneously from all IX flip-flops to the OY flip-flops and from all IY flip-flops to OX flip-flops. Prior to an actual transfer, the same permutation pattern is written as explained above into both the element 92 matrix and the element 94 matrix so that each of a pair of elements 92 and 94 at the same row and column intersection contains the same bit value in its memory core. The OY flip-flops 148, 150, 152 and the OX flip-flops 188, 190, 192 are cleared to binary 0, then signals C1 and signals C2 are simultaneously applied to their respective indicated AND gate terminals. The IX bits are permuted and/or masked to OY and the IY bits are permuted and/or masked to OX according to said stored predetermined pattern. If it is desired to mask any of the IX bits with binary 1, then one or more of the elements 92 in column 4 have their memory cores set ON. Likewise, if any of the IY bits are to be masked by binary 1, then selected ones of the elements 94 in row 4 are set ON. A mask by binary 0 requires that all elements 92 in a particular row must be set OFF for a X to Y transfer, whereas all the elements 94 in a particular column must be set OFF for a Y to X transfer. Output bits, whether OX or OY, can also be the result of logically combining in OR fashion two or more input bits. If a better signal-to-noise ratio is desired, the drive fields may be an alternating pulse causing rotational switching and restoring of the read-out film of an ON element.

FIGURE 6 diagrammatically shows another embodiment of the permutation and masking matrix wherein a configuration of etched circuit wiring and magnetic thin film read-out cores provides an arrangement that can transmit information bits in parallel between X and Y registers in either of two directions. FIGURE 6 is generally comprised of a plurality of magnetic thin film elements 200 arranged by pairs $200_1$ and $200_2$ in four columns and four rows according to both the number of X and Y bits (three) and whether masking by 1 is desired. The illustrated orientation of the various windings inductively coupled with the elements is only representative in FIGURE 6 of their functions, since their actual detailed configuration depends upon which one of several different types of elements 200 is used in the matrix. For example, FIGURE 6 can be constructed either with a transverse data biased bicore element shown in FIGURE 7, or alternatively, with a longitudinal data biased bicore element which is shown in FIGURE 10. Before continuing with the organization of the FIGURE 6 matrix, therefore, reference will first be made to FIGURES 7, 8A, 8B, and 9. FIGURE 7 shows a bicore element $200_1$ or $200_2$ comprised of a thin film memory core 202 whose PMA is transverse, preferably at a right angle, to the PMA of a thin film read-out core 204 inductively coupled therewith. A word winding 206 is inductively coupled with read-out core 204 in such a direction as to apply a field $H_W$ transverse to its PMA. Two drive windings 208 and 210 are inductively coupled with the read-out core in such a direction as to apply respective fields $H_{D1}(1)$ and $H_{D2}(1)$ parallel to its PMA. When current flows through either one of the two drive windings during a transfer time, the other drive winding acts as an output sense winding for the element. Current through word winding 206 in the direction of arrow 212 is assumed to generate the external magnetic field $H_W$ which is shown in FIGURES 8A and 8B to be transverse to the read-out core PMA. The remanent magnetization lying along the PMA of memory core 202 may be in either one of two opposite directions therein so as to generate an external field $H_M(1)$ or $H_M(0)$. When producing field $H_M(1)$, the memory core is assumed to be ON, while it is OFF when producing field $H_M(0)$. The direction of field $H_M(1)$ aids field $H_W$ whereas field $H_M(0)$ opposes and cancels $H_W$. Both $H_W$ and the $H_M$ fields are approximately equal in magnitude so as to either double the net transverse field applied to read-out core 204, or alternatively, to produce a substantially zero transverse field therein. It is further assumed that fields $H_M(1)$ and $H_W$ cause the flux in core 204 to be biased to a position represented by $B_T$ (FIGURE 8A) in the absence of any current through either drive winding 208 or 210. If current is produced in drive winding 208 in the direction of arrow 214, the external field $H_{D1}(1)$ is generated and lies parallel to the core 204 PMA to cause rotation of its flux from position $B_T$ to a position $B_T{}^1$. This said flux rotation changes the magnitude of read-out core flux linking the other non-energized drive winding 210 in the manner illustrated by the different lengths of the dotted lines which are drawn from flux vectors $B_T$ and $B_T{}^1$ parallel to the read-out core PMA. Consequently, and EMF is induced in drive windings 210 so that it thereby acts as an output sense winding whenever interrogation of the read-out core is performed by current in drive winding 208. Conversely, drive winding 210 can alternatively act as the interrogate winding by generating current therethrough in the direction of arrow 216 so as to produce the external field $H_{D2}(1)$. This field likewise causes a rotation of flux in core 204 from position $B_T$ to $B_T{}^1$ so as to induce an EMF in non-energized drive winding 208 which now acts as an output sense winding for the element.

If remanent magnetization in memory core 202 lies in an opposite direction to generate an external field $H_M(0)$, this means that there is no substantial net transverse magnetic field in read-out core 204. The read-out core remanent magnetization for this case is assumed to lie in the direction parallel to its PMA as indicated by vector $B_R$ in FIGURE 8B. Core 204 should be designed with a substantially square hysteresis loop characteristic so that flux $B_R$ is in saturation along its PMA in order that any non-switching external field applied parallel to said PMA will not significantly increase or decrease $B_R$. In other words, if either field $H_{D1}(1)$ or field $H_{D2}(1)$ is applied, the magnitude of the remanent magnetization $B_R$ or any component thereof will not significantly change in a direction perpendicular to the inactivated drive winding. Consequently, with no change in the flux linking the inactivated drive winding there can be no EMF induced therein. Such a null signal at interrogate time indicates that the memory core 202 is OFF. Instead of a unidirectional $H_{D1}(1)$ or $H_{D2}(1)$ pulse causing reversible rotation, the element can also be driven with an alternating pulse causing rotational switching and restoring of an ON state memory core, with possibly a better signal-to-noise ratio.

When the bicore of FIGURE 7 is used to construct the matrix of FIGURE 6, the following interconnections are made between the windings of certain bicore elements 200. For each matrix row the elements $200_1$ and $200_2$ therein have thier word windings 206 connected in series circuit to form row word winding such as 218, 220, 222, and 224 for respective rows 1–4. Each row word winding is U-shaped in the form of a "hair pin" having one leg or branch thereof inductively coupled with only the elements $200_1$, while its other return leg is inductively coupled with only the elements $200_2$. For each matrix column the drive windings 208 of all elements $200_1$ and $200_2$ therein are connected in series circuit to form a column drive winding such as 226, 228, 230, and 232. Each said column is also formed as a "hair pin" whereby the elements $200_1$ are inductively coupled with one leg thereof and the elements $200_2$ are inductively coupled with the other leg thereof. In similar fashion, for each matrix row the elements $200_1$ and $200_2$ therein have their drive windings 210 connected in series circuit to so form a row drive winding such as 234, 236, 238, and 240 for rows 1–4, respectively. These rows drive windings are likewise in the shape of a hair pin with elements $200_1$ being inductively coupled with one leg thereof and elements $200_2$ being inductively coupled with the other leg thereof. The purpose of "hair pin" shaped row and column drive windings, wherein there is a complete current return path through the matrix, is to insure that any coupling between the row and column drive winding at each column-row matrix intersection (due to air-mutual inductance) is cancelled out by oppositely-directed flux linkages at said intersection so as to avoid inducing a false signal on the un-energized drive winding at the time that a current pulse is initiated or terminated in the other drive winding. To best understand ths feature, reference should now be made to FIGURE 9 which shows the actual preferred directional orientation of the windings (each represented by a thin line) as they pass over any pair of FIGURE 7 elements $200_1$ and $200_2$ at some particular FIGURE 6 column and row intersection. For example, assume that the two elements shown in FIGURE 9 are in row 2 and column 2 of the matrix. Each is seen to have its word winding 206 connected to form part of the row word winding 220. Each drive winding 208 is connected to form part of the column drive winding 228, while each drive winding 210 is connected to form part of the row drive winding 236. With the PMA of each read-out core being in the direction shown in FIGURE 9, it is seen that the row word winding 220 is essentially parallel thereto while crossing each element. Each column and row drive winding is perpendicular to the PMA while crossing an element location but they are parallel to each other at this point. Therefore it is to be understood that orientation of the windings as shown in FIGURE 6 is not meant to represent their actual orientation in the vicinity of each element. It will further be noted that the row and column drive windings are also parallel to each other at two other locations of the column-row intersection whereat no bicore elements are to be found. Although an assumption can be ideally made that perfect cancellation occurs of directly induced EMF between parallel segments of the row and drive windings because of the four parallel locations (at two of which this EMF is aiding and at the other two this EMF is opposing), the presence of an element 200 at only one parallel location might make the air-mutual coupling at that point different from that at one or more of the other three parallel locations. Therefore, the purpose in providing two thin film elements $200_1$ and $200_2$ each at different parallel locations of an intersection is to generally insure cancellation of air mutual coupling at the two parallel segment locations where no cores are located. In connection with this, a further assumption is made that a bicore element biased to the OFF condition as in FIGURE 8B does not increase the mutual coupling between the column and row drive lines.

The description of FIGURE 6 will now be continued. Each row word winding is individually connected to one of the group of drivers 242, 244, 246, and 248 which in turn are biased by signals B so as to apply current in a direction to generate the field $H_W$ shown in FIGURES 8A and 8B. Each column drive winding is individually and selectively pulsed by a respective one of the group of drivers 250, 252, 254, and 256. These column drivers produce current in a direction to generate the field $H_{D1}(1)$ and in turn are enabled only when the respective X1, X2 and X3 bits are binary 1's held by respective flip-flops 258, 260, and 262. The 1 output signal of each X flip-flop is gated to its respective column driver by a respective one of the AND gates 264, 266, and 268 upon the application of a C1 signal. Driver 256 is directly enabled by C1 so that a binary 1 masking occurs during an X to Y transfer in the event that any of the column 4 elements have their memory cores set ON. Each row drive winding is energized by a respective one of a group of drivers 270, 272, 274, and 276 in order to produce current flow therethrough which generates the field $H_{D2}(1)$ shown in FIGURES 8A and 8B. Drivers 270, 272, and 274 have enabling inputs derived from respective AND gates 278, 280, and 282 each of which in turn is selectively pulsed by a signal C2 in order to sense the content of respective Y1, Y2, and Y3 flip-flops 284, 286, and 288.

As described in connection with FIGURE 7, only one drive winding of each element $200_1$ and $200_2$ pair is energized during transfer so that the other drive winding thereof acts as the sense winding on which an EMF is induced if said elements are set to the 1 condition. Each column drive winding 226, 228, and 230 acts as an output sense winding for a Y to X transfer, whereas each row drive winding 234, 236, and 238 acts as an output sense winding for a X to Y transfer. AND gates 290, 292, and 294 may be provided each for gating with a C2 signal any induced EMF on the respective column drive winding in order to set the corresponding X flip-flops to its binary 1 condition. AND gates 296, 298, and 300 may likewise be provided which are responsive to C1 signals to transfer induced EMF signals from the row drive windings 234, 236, and 238 into the respective Y1, Y2, and Y3 flip-flops for a X to Y operation. If so desired, an alternative arrangement of FIGURE 6 is one wherein additional X and Y flip-flops are provided in order to receive signals from the AND gates 290–294 and 296–300 in the fashion of FIGURE 5.

In order to conveniently store a permutation pattern into the memory cores of FIGURE 6 when constructed with the FIGURE 7 element, there can be coincident current operation of the row word windings and one of the column drive windings, sequentially by columns, in the following manner. Each of the drivers 242 et al. is biased to produce current flow in one direction or the other through its associated row word winding in order to generate either the field $H_W$ shown in FIGURE 8A or an oppositely directed field $H_W'$. These fields at loading time represent the values of the permutation pattern bits and should be of sufficient magnitude so that, when acting only in conjunction with a small field $H_D$ transverse to the memory core PMA, they switch memory core flux to either one direction or the other along its PMA. However, as has been previously explained in connection with FIGURES 2 and 5, neither writing field $H_W$ or $H_W'$ can by itself cause memory core flux to change direction along its PMA. When the row word winding drivers are so adjusted for the column 1 permutation pattern bits, flip-flop 258 is set to its 1 condition and only AND gate 264 is energized by a C1 signal selectively applied thereto so as to cause driver 250 to produce current flow in column drive winding 226. This current flow applies a small field $H_D$ to each element $200_1$ and $200_2$ of column 1 so as to permit the memory core of each to switch either ON or OFF according to the direction of current flow in its associated row word winding. It should here be appreciated that because of the hairpin shape of the row and column drive windings at each matrix intersection, a similar "hair pin" shape of the row word winding is required in order that both memory cores thereat are identically set either to an ON or OFF condition relative to the drive fields to be applied during a transfer cycle. After the column 1 elements have been loaded, AND gate 264 is de-energized and drivers 242 et al. are now biased to cause current flow representative of the pattern bits to be entered into column 2. Flip-flop 260 is set to binary 1 and only AND gate 266 is energized so as to switch the memory core of each element $200_1$ and $200_2$ of column 2 to its ON or OFF state. Columns 3 and 4 are sequentially loaded in similar fashion.

By placing a permutation pattern in each of the thin film elements $200_1$ and $200_2$ of the matrix, various functions can be provided thereby as has been illustrated by Tables 1–8 previously described in connection with FIGURE 2. At any column-row intersection the memory cores of the element pair $200_1$ and $200_2$ are identically set such that a rotation of flux in the read-out core of one element due to the ON condition of its memory core will be simultaneously accompanied by rotation of flux in the read-out core of the other element. Alternatively, the absence of flux rotation in one read-out core of an element pair (due to the OFF condition of its memory core) is accompanied by the absence of flux rotation in the read-out core of the other element. Because of the "hair pin" windings associated with the element pair at each row-column intersection, aiding EMF signals are induced by both elements $200_1$ and $200_2$ of the same pair on their un-energized drive winding. For example, assume that X2 is to be transferred to Y2 without change in value. In FIGURE 9, the memory core of each element $200_1$ and $200_2$ is set so that if driver 252 subsequently produces current flow in column drive winding 228 (because X2=1), the read-out cores of both said elements induce EMF signals on row drive winding 236 which aid each other. This effectively doubles the magnitude of the output signal.

The use of the FIGURE 7 element in the matrix of FIGURE 6 makes it posible to simultaneously transmit signals in opposite directions only through different ON element pairs. For example, assume that the following transfers are to be simultaneously made: X1 to Y3; X2 to Y1; and Y2 to X3. A permutation pattern is stored in the matrix which sets ON the memory cores of the following element pairs: row 3-column 1; row 2-column 2; and row 2-column 3. All other element pairs have their memory cores set OFF. The actual transfer is then accomplished by simultaneously applying C1 signals to AND gates 264, 266, 296, and 300, while simultaneously applying C2 signals to AND gates 280 and 294. If any of the transferred bits are to be masked by a binary 1 value, then appropriate element memory core pairs in column 4 and/or row 4 are set to binary 1 in accordance with the procedure described in connection with FIGURES 2 and 5.

Instead of using the transverse biased element of FIGURE 7 in the matrix of FIGURE 6, a longitudinal biased bicore element may be employed having the structural configuration shown in FIGURE 10. This is comprised of a magnetic thin film memory core 302 and a magnetic thin film read-out core 304 oriented with parallel PMA, although the memory core 302 may optionally be tilted slightly from the position shown so as to provide a small transverse field component for lower coercivity and faster switching of the read-out core. A word winding 306 is transverse to each PMA as are drive windings 308 and 310, preferably at right angles. Hence, all magnetic fields produced by currents in windings 306, 308, and 310 lie in a direction parallel to the PMA of read-out core 304. Furthermore, the remanent magnetization existing in core 302 also produces an external field which is parallel to the PMA of core 304. When the bicore of FIGURE 10 is utilized for elements $200_1$ and $200_2$ in the FIGURE 6 matrix, the actual orientation of the etched circuit windings at each column-row intersection is shown in FIGURE 11. Each of the pair of elements $200_1$ and $200_2$ is inductively coupled with a different leg of each "hair pin" winding. Thus, assuming that FIGURE 11 shows the element pair at the row 2-column 2 intersection, it is seen that the word winding 306 of each element is connected in series circuit to form part of the row word winding 220 which in turn is connected to driver 244 in FIGURE 6. Each drive winding 308 is connected in series circuit to form part of the column drive winding 228 which in turn is connected to driver 252 in FIGURE 6. Lastly, the second drive winding 310 of each bicore is connected in series circuit to form part of the row drive winding 236 energized by driver 272 in FIGURE 6.

The bicore element of FIGURE 10 may be operated in two different modes. The first mode of operation is that illustrated by the vector diagrams in FIGURES 12A and 12B and the hysteresis loop characteristic shown in FIGURE 13. Each row word winding driver is biased to generate an external field $H_W$ which lies parallel to the PMA of each read-out core 304. When a memory core 302 is OFF, its remanent magnetization lies in a direction along its PMA such that the external field $H_M(0)$ is generated which aids the $H_W$ field in the manner indicated by FIGURE 12A. Core 302 remanent magnetization lying in the opposite direction (ON) generates the external field $H_M(1)$ which cancels the $H_W$ field as indicated in FIGURE 12B. The flux $B_R(0)$ or $B_R(1)$ in a read-out core 304 also lies in a direction along its PMA. The magnitude of a field required to switch the flux in core 304 from one direction $B_R(0)$ to the opposite direction $B_R(1)$, or vice versa, is illustrated by the core hysteresis loop of FIGURE 13. FIGURE 13 shows that the magnitude of any one of the fields $H_W$, $H_M(1)$ and $H_M(0)$ is insufficient by itself to cause said switching of the core 304 flux. The total external field produced by the addition of $H_W$ and $H_M(0)$ biases core 304 to a point $f$ on its hysteresis loop without increasing the magnitude of flux $B_R(0)$ due to its saturated condition. However, if field $H_M(1)$ is instead applied to core 304, said field cancels the $H_W$ field so as to bias core 304 to point $a$ on its loop. FIGURE 12B also illustrates the vector addition in this case where $H_M(1)$ opposes $H_W$. If a single alternating current pulse of sufficient magnitude is now applied to either one of the drive windings 308 or 310 of a bicore in FIGURE 10, there may or may not be a reversal of flux along the core 304 PMA depending upon the point at which the core is biased by the fields $H_W$ and $H_M$. For example, assume that drive winding 308 first transmits current in a direction to generate field $H_{D1}(1)$, followed by current therethrough in the opposite direction to generate a field $H_{D1}(0)$. Where the core is biased to point $a$, the said $H_{D1}(1)$ field causes the traversal of the hysteresis loop along a path $abcd$ to thereby reverse the flux in a read-out core 304 from $B_R(0)$ to $B_R(1)$. This change of flux along the PMA of core 304 is seen to be transverse to the un-energized drive winding 310 such that an EMF is induced therein. The subsequently generated field $H_{D1}(0)$ next causes the hysteresis loop of core 304 to be traversed along a path $defa$ so as to return to its initial starting point with its flux in the direction of $B_R(0)$. This second reversal of flux induces an EMF of opposite polarity on drive winding 310. For the case where a core 304 is biased to point $f$ on the hysteresis loop, as by the aiding fields $H_W$ and $H_M(0)$, the application of current to drive winding 308 of first one polarity and then the other produces no such reversal of flux. This is because the magnitude of the first applied $H_{D1}(1)$ is not sufficient to cause a net positive field sufficient to cause a flux change from $B_R(0)$ to $B_R(1)$. The second applied field $H_{D1}(0)$ temporarily drives the core to point $g$ but since it is in saturation along its PMA the magnitude of flux $B_R(0)$ does not increase. Consequently, with no change of the flux linking winding 310, there is no EMF induced thereon for the condition shown in FIGURE 12A. Alternatively, drive winding 310 may be supplied with a similar alternating current pulse to generate first a field $H_{D2}(1)$ and then a field $H_{D2}(0)$ in order to cause EMF to be induced on winding 308 whenever a memory core is set ON.

The mode of operation illustrated in FIGURES 12A, 12B and 13 may be conveniently provided by the structure of FIGURE 6 in the following manner. The row word drivers 242 et al. are biased so as to continuously produce current flow in a direction to generate the field $H_W$. The column drivers 250 et al. are designed so that upon receipt of a signal indicating an X bit value of 1 they generate a single alternating current pulse. The row drivers 270 et al. are likewise designed to generate a single alternating current pulse when a Y bit is of value 1. By applying the signals C1 and C2 to the terminals of selected AND gates, simultaneous transfers may be made in different directions through different ones of the row-column intersections wherein the elements $200_1$ and $200_2$ are ON. Hence, this first mode of operation of the FIGURE 10 element provides the same general FIGURE 6 matrix function as performed when the FIGURE 7 element is used, i.e., bilateral transfer wherein there can simultaneously be a X to Y coupling through selected ones of the matrix column-row intersections (if the elements therein are ON) and a Y to X coupling through selected different ones of the matrix column-row intersections (if the elements therein are ON). However, it is not possible to simultaneously transfer in both directions through the same ON column-row intersection, as is the case in FIGURE 5.

A second mode of operation of FIGURE 6, when it is constructed with the bicore element of FIGURE 10, is illustrated in FIGURES 14A–D. By this mode the permutation matrix has the ability to pass signals in either selected one of two opposite directions while at the same time blocking any attempt to pass signals in the other non-selected direction. The particular direction of transfer is selected by some external signal. Each said figure shows the square hysteresis loop characteristic of a read-out core 304 as well as the relative magnitudes and directions of the magnetic fields $H_W$, $H_D$, and $H_M$ applied thereto. Each field magnitude is expressed during the following description in terms of a one unit field required to completely switch or reverse the core 304 flux along its PMA. That is to say, an applied field of one unit magnitude is sufficient to cause a completely saturated flux to lie along the core 304 PMA in a direction parallel to said applied field. Using this convention it is assumed therefore that each of the external fields $H_M(0)$ and $H_M(1)$, generated by the remanent magnetization in memory core 302, has a 1½ magnitude in the read-out core 304. Each of the column drivers 250 et al. is further designed to generate a single current pulse of one polarity only which, when applied to the drive winding 308 of an element, generates a field $H_{D1}(1)$ of 2-unit magnitude. Each of the row drivers 270 et al. is also designed so that upon actuation thereof, a current pulse in drive winding 310 produces a field $H_{D2}(0)$ also having a magnitude of 2 units. Each of the row word winding drivers 242 et al. is designed so that current flow in a word winding 306 of an element sets up the field $H_W$ which has a direction in a core 304 tending to drive it to a flux condition represented by $B_R(0)$. However, the magnitude of this word winding current differs according to whether a X to Y or a Y to X transfer is to be made. For Y to X, the external bias signal B to each row word winding driver is adjusted so that the field $H_W$ has a ½ unit magnitude, whereas for a X to Y transfer each external bias signal B is adjusted so that said $H_W$ field has a 2½ unit magnitude. Consequently, it is not possible in this second mode of operation to simultaneously transfer in both directions through the FIGURE 6 matrix since, as will be seen later, an attempt to transfer from X to Y is blocked if the row word winding driver current is set to a magnitude for the Y to X transfer. Conversely, an attempt to transfer from Y to X is blocked if the word driver current is set to the magnitude for an X to Y transfer.

To illustrate the above, consider first the case where the Y2 bit, say of value 1, is to be transferred to the X2 position. This requires that the memory cores of both elements $200_1$ and $200_2$ at the row 2-column 2 intersection in FIGURE 6 be ON so that the external field $H_M(1)$ of 1½ unit magnitude is produced in the read-out core of each. This field is in a direction to oppose a ½ unit field $H_W$ generated by current flowing in row word winding 220. Since the $H_W$ and $H_M(1)$ fields oppose one another, a net field of 1 unit magnitude biases the read-out core of each element to a point $c$ on its hysteresis loop prior to the application of current to any one of its drive windings. This condition of bias is shown in FIGURE 14A where it is seen that point $c$ on the hysteresis loop causes the flux in each read-out core to be in a direction $B_R(1)$. Signal C2 is now applied to AND gate 280 in FIGURE 6 causing driver 272 to generate a current pulse through row drive winding 236 which has a magnitude sufficient to create a 2 unit magnitude field $H_{D2}(0)$ in a direction to oppose the net 1 unit biasing field. The hysteresis loop of each read-out core at the row 2-column 2 intersection is traversed along the path $cdefab$ to cause two complete reversals of its flux. Said flux reverses from $B_R(1)$ to $B_R(0)$ and then back to $B_R(1)$ at the termination of the $H_{D2}(0)$ field. This flux change in each read-out core of the elements $200_1$ and $200_2$ thereupon induces aiding EMF's on column drive winding 228 so as to place a binary 1 value into flip-flop 260 of FIGURE 6.

If a read-out core is biased to point $c$ on its loop it is impossible to effect a X to Y transfer even if its column drive winding is pulsed. For example, if an attempt is made to transfer a X2 bit of value 1 to the Y2 flip-flop 286, the application of a current pulse to column drive winding 228 has a direction to generate the field $H_{D1}(1)$ of a 2 unit magnitude. This field, as shown in FIGURE 14A, is in the same direction as the existing $B_R(1)$ flux so as to cause a loop path of $cgc$. Because the read-out core is already saturated in the $B_R(1)$ direction, any field $H_{D1}(1)$ applied thereto fails to increase the magnitude of the $B_R(1)$ flux. Consequently, there would be no change of flux linking the row drive winding 236 and so a binary 1 value will not be entered into the Y2 flip-flop 286.

FIGURE 14A thus shows the case where elements $200_1$ and $200_2$ of a pair have their memory cores set ON so as to permit the transfer of a binary 1 Y bit. If the memory cores are instead set to their OFF condition, then no such transfer is permitted. To illustrate this case, consider now FIGURE 14B wherein it is assumed that the remanent magnetization in each memory core of a particular pair of elements $200_1$ and $200_2$ lies in a direction such that the 1½ unit field $H_M(0)$ is generated. This field aids the ½ unit field $H_W$ so as to bias each read-out core to approximately point g on its hysteresis loop. This is sufficient to cause the flux in each read-out core to lie in the direction $B_R(0)$ along its PMA. If now the 2 unit field $H_{D2}(0)$ is generated, as by energizing driver 272 in FIGURE 6, the read-out core flux will not change either in direction or in magnitude because the path followed along the hysteresis loop is ghg. Conversely, if an attempt is made to transfer from X to Y for the biased condition shown in FIGURE 14B, the 2 unit field $H_{D1}(1)$ causes the hysteresis loop to be traversed along a path gbabg. Again, there is no net positive field strong enough to cause a reversal of flux from $B_R(0)$ to $B_R(1)$ which means that a X bit binary 1 value cannot be transferred into a Y bit flip-flop.

Figure 14C:
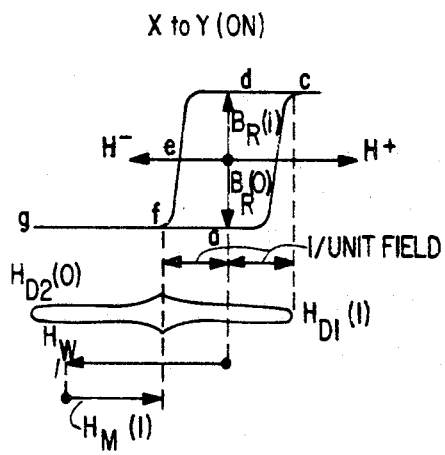
Figure 14B:
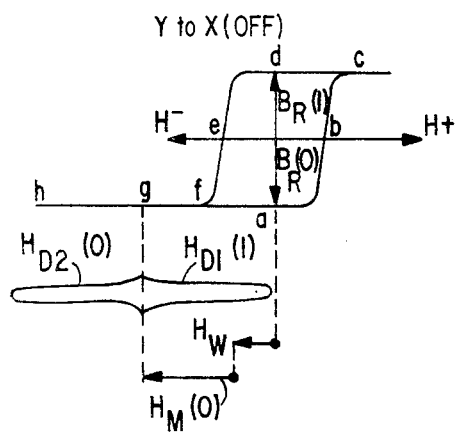

For a proper X to Y transfer, the magnitude of the $H_W$ field is increased to approximately 2½ units although its direction remains the same in a read-out core. As an example, assume that an X2 bit of value 1 is to be transferred to the Y2 flip-flop 286 in FIGURE 6. This requires that each memory core of elements $200_1$ and $200_2$ at the row 2-column 2 intersection must be ON so as to generate the field $H_M(1)$. As shown in FIGURE 14C, the 2½ unit $H_W$ field and the 1½ unit $H_M(1)$ field oppose each other such that each read-out core is biased to about point f upon its hysteresis loop. Consequently, the direction of flux in each read-out core is in the direction $B_R(0)$ prior to the time that the actual bit transfer occurs. Signal C1 is now applied to AND gate 266 and AND gate 298. Since flip-flop 260 is assumed to have a binary 1 therein, current is produced by driver 252 in column drive winding 228 having a direction and magnitude to generate the 2 unit field $H_{D1}(1)$. This causes a traversal of the hysteresis loop along a path fabcdef so as to reverse flux from $B_R(0)$ to $B_R(1)$ and then back to $B_R(0)$. This causes an EMF to be induced on row digit winding 236 which is applied via AND gate 298 to the input of flip-flop 286. However, if a Y to X transfer is attempted when a read-out core is biased to a point f on its loop, it will be seen that the application of a field $H_{D2}(0)$ does not cause any change in the magnitude or direction of the core flux.

Figure 14D:
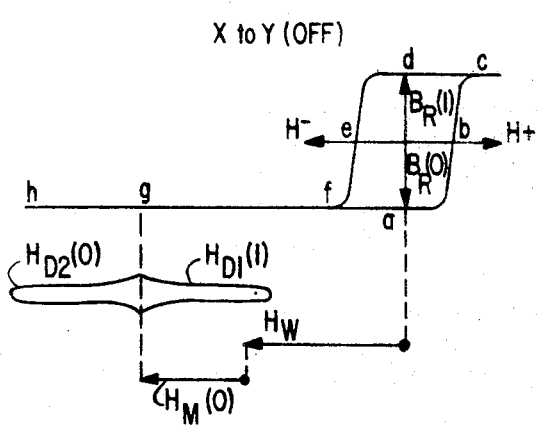

FIGURE 14D shows an attempted X to Y transfer through a FIGURE 6 matrix intersection whose elements $200_1$ and $200_2$ both have their memory cores set OFF. The 1½ unit field $H_M(0)$ which is generated by each memory core adds to the 2½ unit field $H_W$ so as to bias a read-out core to a point g on its hysteresis loop. A transfer of a X bit to a Y bit output cannot take place because the 2 unit transfer field $H_{D1}(1)$ is not large enough to overcome the large opposing $H_W+H_M(0)$ field present in the read-out core. Furthermore, a Y to X attempted transfer through the biased core condition of FIGURE 14D merely causes a loop path of ghg when the field $H_{D2}(0)$ is applied. Consequently, there can be no induced EMF on the unenergized drive winding from a matrix column-row intersection when its pair of readout cores are biased according to FIGURE 14D.

When the matrix of FIGURE 6 is constructed with the longitudinal biased Bicore element of FIGURE 10, the following procedure may be used in loading the permutation pattern bits into the memory cores of said elements. A current in one direction or the other is applied to only one of the row word windings 218 et al. simultaneously with the application of a current in the same direction to only one of the column drive windings 226 et al. Each said current is only large enough to generate a field of ½ unit magnitude relative to the hysteresis loop of a memory core. Consequently, only one column-row intersection of the matrix will have its two memory cores exposed to a net longitudinal field of 1 unit magnitude so as to switch them either to the ON or OFF state according to the direction of the 1 unit field. This means that the matrix is loaded not only sequentially by column, but for any column sequentially by row. Alternatively, another set of row-oriented drive windings not shown in FIGURES 6 or 10 but similar to windings 206 of FIGURES 7 and 9, could be added to the matrix wiring configuration for applying a field transverse to the PMA of memory core 302. Loading of the permutation pattern bits could then be done sequentially by rows, using coincident transverse and longitudinal field pulses applied by only one of the added row-oriented drive windings and all of the column drive windings 226 et al., each column drive winding carrying a pulse of polarity determined by the bit to be stored in the memory core in its column. The loading of the permutation pattern by either mode of operation is followed preferably by a dummy permute cycle to insure that the read-out core 304 is left at the appropriate point a or f of its hysteresis loop and not in the $B_R(1)$ remanent flux condition.

While preferred embodiments of the invention have been shown and/or described, it is apparent that modifications may be made thereto without departing from the novel principles defined in the appended claims.

The embodiments of the invention in which an exclusive property or privilege is claimed are defined as follows:

1. A binary digital permutation transfer system which comprises:
   (a) a matrix of magnetic thin film read-out cores of the single preferred magnetic axis type which are arranged in a number of columns and a number of rows;
   (b) first means for selectively and individually biasing the magnetic flux in each said read-out core to either a first condition or a second condition according to a permutation pattern;
   (c) a number of matrix column winding means one for each different said matrix column and inductively coupled with read-out cores therein, and a number of matrix row winding means one for each different said matrix row and inductively coupled with read-out cores therein, where for each matrix read-out core a column winding means and a row winding means inductively coupled therewith are oriented so that a current pulse of predetermined polarity in one of said winding means generates a magnetic field which in turn temporarily changes only first condition flux in the said read-out core to a third condition whereby a first signal is induced in the other of said winding means;
   (d) a plurality of second means one for each of a number of said matrix winding means and connected therewith for individually and selectively producing said predetermined polarity current pulse therein at a transfer time only in response to a binary digit of some predetermined value to be transferred; and,
   (e) at least one third means connected with at least one of said matrix winding means other than one connected to a said second means, for producing said predetermined polarity current pulse therein at the transfer time.

2. A system according to claim 1 wherein there are a number M of matrix rows and a number M+N of matrix columns; there are M said second means each connected to different ones of M matrix column winding means; and there are N said third means each connected to a different one of the remaining N column winding means.

3. A system according to claim 1 wherein there are at least a number M of matrix rows and a number $M+N$ of matrix columns; there are 2M said second means each connected to a different one of M matrix column winding means and M matrix row winding means; and there are N said third means each connected to a different one of the remaining N column winding means.

4. A system according to claim 1 wherein there are a number M of matrix rows and a number $M+N$ of matrix columns, with each matrix column having therein M read-out cores one at each column-row intersection; there are M said second means and N said third means; each of M matrix column winding means is comprised of a single conductor connected to a different said second means and inductively coupled with each read-out core in its column; each of the remaining N matrix column winding means is connected to a different said third means and is comprised of a single conductor inductively coupled with every read-out core in its column; and each said matrix row winding means is a single conductor inductively coupled with every read-out core in its row.

5. A system according to claim 1 wherein there are at least a number M of matrix rows and a number $M+N$ of matrix columns, with each M matrix columns having therein at least M first read-out cores and at least M second read-out cores one of each at each of M column-row intersections; and with each of the remaining N matrix columns having therein at least M first read-out cores one at each of said M column-row intersections; there are 2M said second means and at least N said third means; each matrix column winding means for said M columns is comprised of both a single first conductor connected to a different said second means and inductively coupled with each said first read-out core in its column, and a single second conductor inductively coupled with each said second readout core in the column; each matrix column winding means for said N columns is comprised of a single first conductor connected to a different said third means and inductively coupled with each first read-out core in its column; and each of M matrix row winding means is comprised of both a single third conductor inductively coupled with each said first read-out core in its row, and a single fourth conductor connected to a different said third means and inductively coupled with each said second read-out core in its row.

6. A system according to claim 1 wherein there are at least a number M of matrix rows and a number $M+N$ of matrix columns, with each matrix column having therein at least M first read-out cores and at least M second read-out cores one of each at each of M column-row intersections; there are 2M said second means and at least N said third means; each matrix column winding means for said M columns is comprised of a single first hairpin conductor connected to a different said second means and inductively coupled in a first direction with each said first read-out core in its column and in a second opposite direction with each said second read-out core in its columns; each matrix column winding means for said N columns is comprised of a single first hairpin conductor connected to a different said third means and inductively coupled in said first direction with each said first read-out core in its column and in said second opposite direction with each said second readout core in its column; and each of M matrix row winding means is comprised of a single second hairpin conductor connected to a different said second means and inductively coupled in said first direction with each said first read-out core in its row and in said opposite direction with each said second read-out core in its row.

7. A system according to claim 1 wherein said first means comprises in combination a plurality of first biasing means each individual to a different said read-out core for selectively applying thereto a first biasing magnetic field in either a first direction or a second diametrically opposed direction, and second biasing means for applying to all said read-out cores a second biasing field only in said first direction.

8. A system according to claim 7 wherein each said individual first biasing means is comprised of a magnetic thin film memory core having a single preferred magnetic axis.

9. A system according to claim 7 wherein said second biasing means is comprised of word winding means and current producing means therefor inductively coupled with each said read-out core.

10. A binary digital permutation transfer system which comprises:
  (a) a matrix of magnetic thin film read-out cores of the single preferred magnetic axis type which are arranged in a number M of rows and a number $M+N$ of columns, with each column having M read-out cores therein one at each column-row intersection;
  (b) a plurality of first biasing means each individual to a different said read-out core for selectively applying thereto, in accordance with a permutation pattern, a first biasing magnetic field of some first magnitude substantially normal to the preferred magnetic axis and having either a first direction or a second diametrically opposed direction, and second biasing means for applying to each said read-out core a second biasing magnetic field of said same first magnitude substantially normal to the preferred magnetic axis but only in said second direction, whereby a respectively zero or net normal magnetic field places read-out core flux either in a first position substantially parallel to the preferred magnetic axis, or in a second position at an angle with the preferred magnetic axis, respectively;
  (c) a number $M+N$ of matrix column drive winding conductors one for each matrix column which is inductively coupled with each read-out core therein in a direction substantially normal to its preferred magnetic axis, and a number M of matrix row sense winding conductors one for each matrix row which is inductively coupled with each read-out core therein in a direction substantially parallel to its preferred magnetic axis, whereby a current pulse in a said column drive winding conductor produces a magnetic field which in turn rotates only read-out core flux standing at said second position so that a first signal is induced in a said row sense winding conductor;
  (d) a number M of second means each connected to a different one of M column drive winding conductors for individually and selectively generating said current pulse therein at a transfer time but only in response to a binary digit of some predetermined value to be transferred; and
  (e) a number N of third means each connected to a different one of the remaining N column drive winding conductors for generating said current pulse therein at the transfer time.

11. A system according to claim 10 wherein each said first biasing means comprises a magnetic thin film memory core having a single preferred magnetic axis substantially normal to the read-out core preferred magnetic axis.

12. A system according to claim 11 wherein said second biasing means comprises a number M of row word winding conductors and current generating means therefor one for each matrix row which is inductively coupled with each read-out core therein in a direction substantially parallel to its preferred magnetic axis.

13. A system according to claim 12 wherein said current generating means for said second biasing means is further adapted, for each row word winding conductor, to selectively produce current flow therein in either direction and of sufficient magnitude to change the flux direction in each memory core only during the presence of a magnetic field transverse to its preferred magnetic axis.

14. A binary digital permutation transfer system which comprises:
(a) a matrix of magnetic thin film read-out cores of the single preferred magnetic axis type which are arranged in at least a number M of rows and at least a number M of columns, with each of M matrix columns having therein at least M first read-out cores and at least M second read-out cores one of each at each of M column-row intersections;
(b) a plurality of first biasing means each individual to a different said read-out core for selectively applying thereto, in accordance with a permutation pattern, a first biasing magnetic field of some first magnitude substantially normal to the preferred magnetic axis having either a first direction or a second diametrically opposed direction, and second biasing means for applying to each said read-out core a second biasing magnetic field of said same first magnitude substantially normal to the preferred magnetic axis but only in said second direction, whereby a respectively zero or net normal magnetic field places read-out core flux either in a first position substantially parallel to the preferred magnetic axis, or in a second position at an angle with the preferred magnetic axis, respectively;
(c) at least a number M of matrix column drive winding conductors one for each matrix column which is inductively coupled with each first read-out core therein in a direction substantially normal to its preferred magnetic axis, and a number M of matrix row sense winding conductors one for each of said M matrix rows which is inductively coupled with each first read-out core therein in a direction substantially parallel to its preferred magnetic axis, whereby a current pulse in a said column drive winding conductor produces magnetic field which in turn rotates only first read-out core flux standing at said second position so that a first signal is induced in a said row sense winding conductor;
(d) at least a number M of matrix row drive winding conductors one for each of said M matrix rows which is inductively coupled with each second read-out core therein in a direction substantially normal to its preferred magnetic axis, and a number M of column sense winding conductors one for each of said M matrix columns which is inductively coupled with each second read-out core therein in a direction substantially parallel to its preferred magnetic axis, whereby a current pulse in a said row drive winding conductor produces a magnetic field which in turn rotates only second read-out core flux standing at said second position so that a first signal is produced in a said column sense winding conductor; and
(e) a number 2M of second means each connected to a different one of said M matrix column drive winding conductors and said M matrix row drive winding conductors for individually and selectively generating said current pulse therein at a transfer time but only in response to a binary digit of some predetermined value to be transferred.

15. A system according to claim 14 wherein is further included an additional number N of matrix columns each having therein M first read-out cores one at each of said M column-row intersections; an additional number N of matrix column drive winding conductors one for each additional matrix column which is inductively coupled with each first read-out core therein in a direction substantially parallel to its preferred magnetic axis, and at least a number N of third means each connected to a different one of said N column drive winding conductors for generating said current pulse therein at the transfer time.

16. A system according to claim 15 which further includes at least one additional matrix row having therein M second read-out cores one in each of said M columns, and at least one additional matrix row drive winding conductor together with an additional third means therefor which is inductively coupled with each second read-out core in said additional row in a direction substantially normal to its preferred magnetic axis.

17. A system according to claim 14 wherein each said first biasing means comprises a magnetic thin film memory core having a single preferred magnetic axis substantially normal to the read-out core preferred magnetic axis.

18. A system according to claim 17 wherein said second biasing means comprises at least a number M of row word winding conductors and current generating means therefor one for each of said M matrix rows which is inductively coupled with each first read-out core and each second read-out core therein in a direction substantially parallel to its preferred magnetic axis.

19. A system according to claim 18 wherein is further included at least a number M of matrix column write drive winding conductors and current generating means therefor one for each of said M columns which is inductively coupled with the memory core of each first read-out core and each second read-out core therein in a direction substantially parallel to its preferred magnetic axis, and wherein said current generating means for said second biasing means is further adapted, for each row word winding conductor, to selectively produce current flow therein in either direction and of sufficient magnitude to change the flux direction in each memory core only during the presence of a magnetic field transverse to its preferred magnetic axis.

20. A binary digital permutation transfer system which comprises:
(a) a matrix of magnetic thin film read-out cores of the single preferred magnetic axis type which are arranged in at least a number M of columns and at least a number M of rows, with each column having therein at least M first read-out cores one at each of M column-row intersections;
(b) a plurality of first biasing means each individual to a different said read-out core for selectively applying thereto, in accordance with a permutation pattern, a first biasing magnetic field of some first magnitude substantially normal to the preferred magnetic axis and having either a first direction or a second diametrically opposed direction, and second biasing means for applying to each said read-out core a second biasing magnetic field of said same first magnitude substantially normal to the preferred magnetic axis but only in said second direction, whereby a respectively zero or net normal magnetic field places read-out core flux either in a first position substantially parallel to the preferred magnetic axis, or in a second position at an angle with the preferred magnetic axis, respectively;
(c) at least a number M of matrix column drive winding conductors one for each of said M matrix columns which is in the shape of a hairpin having one leg thereof inductively coupled with each said first read-out core therein in a direction substantially normal to its preferred magnetic axis and at least a number M of matrix row drive winding conductors one for each of said M matrix rows which is in the shape of a hairpin having one leg thereof inductively coupled with each said first read-out core therein in a direction substantially normal to its preferred magnetic axis, where for each matrix column-row intersection there are four locations at which there are parallel segments of a column drive winding conductor and a row drive winding conductor, whereby a current pulse in either drive winding conductor produces a magnetic field which in turn rotates only first read-out core flux standing at said second position such that a first signal is induced in the other drive winding conductor; and
(d) a number 2M of second means one for each of said M column drive winding conductors and one for each of said M row drive winding conductors for individually and selectively producing said current pulse therein at a transfer time but only in response to a binary digit of predetermined value to be transferred.

21. A system according to claim 20 wherein is further included an additional number N of matrix columns each with at least M first read-out cores therein one at each of said M column-row intersections; an additional number N of matrix column drive winding conductors one for each of said additional N matrix columns which is in the shape of a hairpin having one leg thereof inductively coupled with each first read-out core therein; and a number N of third means each connected with a different one of said additional N column drive winding conductors for producing a current pulse therein at the transfer time.

22. A system according to claim 20 wherein is further included at least M second read-out cores in each matrix column one at each of M column-row intersections, with each matrix column drive winding having its other leg inductively coupled with each second read-out core in its column in a direction substantially normal to its preferred magnetic axis, and each matrix row drive winding having its other leg inductively coupled with each second read-out core in its row in a direction substantially normal to its preferred magnetic axis.

23. A system according to claim 22 wherein each said first biasing means comprises a magnetic thin film memory core having a single preferred magnetic axis substantially normal to the read-out core preferred magnetic axis and wherein said second biasing means comprises at least a number M of row word winding conductors and current generating means therefor one for each matrix row which is in the shape of a hairpin having one leg thereof inductively coupled with each first read-out core therein and the other leg thereof inductively coupled with each second read-out core therein.

24. A system according to claim 20 wherein each said first biasing means comprises a magnetic thin film memory core having a single preferred magnetic axis substantially normal to the read-out core preferred magnetic axis.

25. A system according to claim 24 wherein said second biasing means comprises a number M of row word winding conductors and current generating means therefor one for each matrix row which is inductively coupled with each read-out core therein in a direction substantially parallel to its preferred magnetic axis.

26. A system according to claim 25 wherein said current generating means for said second biasing means is further adapted, for each row word winding conductor, to selectively produce current flow therein in either direction and of sufficient magnitude to change the flux direction in each memory core only during the presence of a magnetic field transverse to its preferred magnetic axis.

27. A binary digital permutation transfer system which comprises:
(a) a matrix of magnetic thin film read-out cores of the single preferred magnetic axis type having generally a rectangular hysteresis loop characteristic which are arranged in at least a number M of columns and at least a number M of rows, with each column having therein at least M first read-out cores one at each of M column-row intersections;
(b) a plurality of first biasing means each individual to a different said read-out core for selectively applying thereto, in accordance with a permutation pattern, a first biasing magnetic field substantially parallel to the preferred magnetic axis and having either a first direction or a second diametrically opposed direction, and second biasing means for applying to each said read-out core a second biasing magnetic field substantially parallel to the preferred magnetic axis but only in said first direction, whereby said read-out core is respectively biased to either a first position or a second position on its hysteresis loop;
(c) at least a number M of matrix column drive winding conductors one for each of said M matrix columns which is in the shape of a hairpin having one leg thereof inductively coupled with each said first read-out core therein in a direction substantially normal to its preferred magnetic axis and at least a number M of matrix row drive winding conductors one for each of said M matrix rows which is in the shape of a hairpin having one leg thereof inductively coupled with each said first read-out core therein in a direction substantially normal to its preferred magnetic axis, where for each matrix column-row intersection there are four locations at which there are parallel segments of a column drive winding conductor and a row drive winding conductor, whereby a current pulse of proper predetermined polarity in either drive winding rotates only first read-out core flux biased to said loop second position such that a first signal is induced in the other drive winding conductor; and
(d) a number 2M of second means one for each of said M column drive winding conductors and one for each of said M row drive winding conductors for individually and selectively producing said current pulse therein at a transfer time but only in response to a binary digit of predetermined value to be transferred.

28. A system according to claim 27 wherein is further included at least M second read-out cores in each matrix column one at each of M column-row intersections, with each matrix column drive winding having its other leg inductively coupled with each second read-out core in its column in a direction substantially normal to its preferred magnetic axis, and each matrix row drive winding having its other leg inductively coupled with each second read-out core in its row in a direction substantially normal to its preferred magnetic axis.

29. A system according to claim 27 wherein is further included an additional number N of matrix columns each with at least M first read-out cores therein one at each of said M column-row intersections; an additional number N of matrix column drive winding conductors one for each of said additional N matrix columns which is in the shape of a hairpin having one leg thereof inductively coupled with each first read-out core therein; and a number N of third means each connected with a different one of said additional N column drive winding conductors for producing a current pulse therein at the transfer time.

30. A system according to claim 27 wherein said second biasing means maintains said second magnetic field at the same magnitude for either direction of digit transfer through the matrix, and each said second means can generate a single alternating current pulse for twice reversing the read-out core flux if biased to its said loop second position.

31. A system according to claim 27 wherein each said second means connected to the column drive winding conductors can generate only a single direct current pulse of a first polarity and each said second means connected to the row drive winding conductors can generate only a single direct current pulse of opposite polarity, while said second biasing means can selectively apply a second biasing magnetic field which has a different magnitude for each direction of digit transfer through the matrix.

32. A system according to claim 27 wherein each said first biasing means comprises a magnetic thin film memory core having a single preferred magnetic axis substantially parallel to the read-out core preferred magnetic axis.

33. A system according to claim 32 wherein said second biasing means comprises at least a number M of row winding conductors and current generating means therefor one for each matrix row which is inductively coupled with each read-out core therein in a direction substantially normal to its preferred magnetic axis.

34. A digital permutation transfer system comprising:
   a plurality of row drive winding means;
   a plurality of column drive winding means;
   a matrix comprising a plurality of rows and columns of thin film memory cores, each of said memory cores being inductively coupled with a row drive winding means and a column drive winding means;
   a matrix comprising a plurality of rows and columns of thin film readout cores, each inductively coupled to one of said memory cores and one of said column drive winding means;
   a plurality of sense lines, each inductively coupled to the readout cores in one of said rows;
   first means for applying signals representing the bits of a number to said column drive winding means;
   and means operative prior to said first means for selectively energizing said row drive winding means and said column drive winding means to thereby drive selected ones of said memory cores to a predetermined magnetic state indicating bit transfer paths from said first means to said sense lines;
   whereby a bit applied to one of said drive winding means may be directed to any one of said sense lines as determined by the magnetic state of said memory cores.

35. A digital permutation transfer system as claimed in claim 34 and further comprising selective masking means, said masking means comprising:
   a further plurality of thin film memory cores, each inductively coupled to one of said row drive winding means;
   a further plurality of thin film readout cores, each inductively coupled to one of said sense lines and one of said memory cores of said further plurality of memory cores;
   a further column drive winding means inductively coupled to each of said further plurality of memory cores;
   and means for selectively energizing said further column drive winding means, said last named energizing means including means for energizing said further column drive winding means concurrently with the selective energization of said row drive winding means whereby each of said further memory cores is set to a predetermined magnetic state if the bit on the associated sense line is to have a predetermined value independent of the values applied to said row drive winding means;
   said last named energizing means further including means for again energizing said further column drive winding means to induce a signal representing said predetermined value in one of said sense lines if the associated memory core has been set to said predetermined magnetic state.

References Cited

UNITED STATES PATENTS

| | | | |
|---|---|---|---|
| 3,125,745 | 3/1964 | Oakland | 340—174 |
| 2,973,508 | 2/1961 | Chadurjian | 340—172.5 |
| 3,268,819 | 8/1966 | Eachus | 340—174 X |
| 2,997,695 | 8/1961 | Conger et al. | 340—174 |
| 3,111,580 | 11/1963 | Keefer | 340—174 |
| 3,179,928 | 4/1965 | Sorenson | 340—174 |

BERNARD KONICK, Primary Examiner

S. B. POKOTILOW, Assistant Examiner

U.S. Cl. X.R.

340—172.5